United States Patent [19]

Yamada et al.

[11] Patent Number: 5,536,773
[45] Date of Patent: Jul. 16, 1996

[54] POLYPROPYLENE RESIN COMPOSITION AND THE USE OF THE SAME

[75] Inventors: Masaya Yamada; Michio Toriumi; Yasuo Futami, all of Ichihara; Tetsunori Shinozaki; Mamoru Kioka, both of Waki-cho, all of Japan

[73] Assignee: Mitsui Petrochemical Industries, Ltd., Tokyo, Japan

[21] Appl. No.: 274,751

[22] Filed: Jul. 14, 1994

[30] Foreign Application Priority Data

Jul. 16, 1993 [JP] Japan .................................. 5-177020
Jul. 16, 1993 [JP] Japan .................................. 5-177024

[51] Int. Cl.$^6$ .......................... C08L 57/02; C08L 45/00; C08L 23/12; C08L 43/00
[52] U.S. Cl. .......................... 524/499; 525/210; 525/211; 525/216; 525/240; 525/209
[58] Field of Search .......................... 524/499; 525/209, 525/210, 211, 216, 240

[56] References Cited

U.S. PATENT DOCUMENTS

| | | | |
|---|---|---|---|
| 3,278,646 | 10/1966 | Lambert, Jr. | 525/210 |
| 3,361,849 | 1/1968 | Cramer et al. | 525/210 |
| 3,663,488 | 5/1972 | Kail | 525/210 |
| 3,865,903 | 2/1975 | Nahmias et al. | 525/210 |
| 4,032,493 | 6/1977 | Pascual | 525/216 |
| 4,522,994 | 6/1985 | Chiba et al. | 525/240 |
| 4,551,501 | 11/1985 | Shiga et al. | 525/216 |
| 4,603,174 | 7/1986 | Okada et al. | 525/240 |
| 4,748,207 | 5/1988 | Kakugo et al. | 525/216 |
| 4,869,938 | 9/1989 | Usami et al. | 525/240 |
| 4,927,885 | 5/1990 | Hagashida et al. | 525/211 |
| 4,990,477 | 2/1991 | Kioka et al. | 502/107 |
| 4,990,479 | 2/1991 | Ishimaru et al. | 507/125 |
| 5,026,778 | 6/1991 | Fujii et al. | 525/210 |
| 5,091,237 | 2/1992 | Schloegl et al. | 525/240 |
| 5,115,027 | 5/1992 | Ogawa et al. | 525/216 |
| 5,141,994 | 8/1992 | Kakugo et al. | 525/216 |
| 5,159,021 | 10/1992 | Kioka et al. | 525/247 |
| 5,212,009 | 5/1993 | Peiffer et al. | 525/240 |
| 5,247,031 | 9/1993 | Kioka et al. | 526/125 |
| 5,266,636 | 11/1993 | Kioka et al. | 525/95 |
| 5,290,635 | 3/1994 | Matsumura et al. | 525/210 |
| 5,412,020 | 5/1995 | Yamamoto et al. | 525/505 |
| 5,438,110 | 8/1995 | Ishimaru et al. | 526/125 |

FOREIGN PATENT DOCUMENTS

| | | |
|---|---|---|
| 0247898 | 12/1987 | European Pat. Off. . |
| 0321218 | 6/1989 | European Pat. Off. . |
| 0185635 | 10/1983 | Japan .................................. 525/216 |
| 0023672 | 2/1986 | Japan .................................. 524/499 |
| 0218125 | 9/1986 | Japan .................................. 524/499 |
| 0235445 | 10/1986 | Japan .................................. 524/499 |
| 0229056 | 9/1989 | Japan .................................. 525/240 |
| 0247444 | 10/1989 | Japan .................................. 525/240 |
| 0024195 | 10/1994 | WIPO .................................. 524/476 |

OTHER PUBLICATIONS

Patent Abstract of Japan, 60-90734 (A), 1985.
Patent Abstract of Japan, 61-209207 (A), 1986.
Patent Abstract of Japan, 62-104810 (A), 1987.
Patent Abstract of Japan, 62-104811 (A), 1987.
Patent Abstract of Japan, 62-104812 (A), 1987.
Patent Abstract of Japan, 62-104813 (A), 1987.
Patent Abstract of Japan, 1-311106 (A), 1989.
Patent Abstract of Japan, 1-318011 (A), 1989.
Patent Abstract of Japan, 2-166104 (A), 1990.
Database WPI, Derwent Publications Ltd., London, GB, AN 88-100799, Mar. 1988.
Database, WPI, Derwent Publications Ltd., London, GB, AN 80-59674C, Jul. 1980.
Database WPI, Derwent Publications Ltd., London, GB, AN 85-095052, Feb. 1985.
Database, WPI, Derwent Publications Ltd., London. GB, AN 85-027389, Dec. 1984.
Ser. No. 08/351,136 Nov., 1994 Shinozaki et al.

*Primary Examiner*—Peter A. Szekely

[57] ABSTRACT

Disclosed are a polypropylene resin composition comprising a crystalline polypropylene having a high stereoregularity and a terpene resin and a petroleum resin each having no polar group; a polypropylene stretched film formed from the polypropylene resin composition; and a polypropylene multi-layer stretched film having a base layer formed from the polypropylene resin composition and a surface layer formed from a polypropylene type polymer. The polypropylene stretched film and a polypropylene multi-layer stretched film have excellent water-vapor barrier properties and transparency, and a high Young's modulus.

Further, disclosed are a polypropylene resin composition comprising a crystalline polypropylene having a high stereoregularity and a hydrogenated petroleum resin; a PTP packaging polypropylene sheet formed from the polypropylene resin composition; and a PTP packaging polypropylene multi-layer sheet having a base layer formed from the polypropylene resin composition and a surface layer formed from a propylene type polymer, wherein the proportion of the thickness of the base layer to the total thickness of the sheet is more than 50%, and the total thickness of the sheet and the proportion of the thickness of the base layer satisfy the specific relationship. The PTP packaging polypropylene sheet and the PTP packaging polypropylene multi-layer sheet have excellent water-vapor barrier properties and transparency, and a high rigidity.

18 Claims, No Drawings

5,536,773

POLYPROPYLENE RESIN COMPOSITION AND THE USE OF THE SAME

FIELD OF THE INVENTION

The present invention relates to a polypropylene resin composition comprising a crystalline polypropylene having a high stereoregularity and a terpene resin having no polar group and a petroleum resin having no polar group, a stretched film formed therefrom, and a multi-layer stretched film having a base layer formed therefrom; and a polypropylene resin composition comprising a crystalline polypropylene having a high stereoregularity and a hydrogenated petroleum resin, a press-through pack packaging polypropylene sheet formed therefrom and a press-through pack packaging polypropylene multi-layer sheet having a base layer formed therefrom.

BACKGROUND OF THE INVENTION

It has been well known that polyolefins such as crystalline polypropylene are obtained by polymerizing olefins in the presence of so-called Ziegler-Natta catalyst which comprises a compound of a transition metal of Group IV to Group VI in the periodic table and an organometallic compound of a metal of Group I to Group III of the periodic table. Recently, there have been made studies on a process in which crystalline polyolefins of high stereoregularity can be obtained with high polymerization activity using such catalysts as mentioned above, as described in, for example, Japanese Patent Laid-Open Publications No. 09207/1986, No. 104810/1987, No. 104811/1987, No. 04812/1987, No. 104813/1987, No. 311106/1989, No. 318011/1989 and No. 166104/1990.

Such a crystalline polypropylene having a high stereoregularity is high in rigidity and usually has a high heat distortion temperature, a high melting point and a high crystallization temperature, and hence it shows excellent properties such as high heat resistance, high crystallization speed and high transparency. Accordingly, the crystalline polypropylene has been applied to various uses such as containers and films.

Though, a film made from the above-mentioned crystalline polypropylene has excellent water-vapor barrier properties as compared to a film comprising polyamide or polyester, it is not always sufficient in the water-vapor barrier properties to apply for the use in which an extremely high water-vapor barrier property is required, for example, a film for packaging a cigarette. Therefore, for such use that an extremely high water-vapor barrier property is required, the so-called K-OP film of which polyvinylidene chloride (PVDC) is coated on the surface of a biaxially oriented polypropylene film (OPP film) is usually used. However, the K-OP film has such problems. that chlorine gas generates when incinerating, since it contains the PVDC. Moreover, the film cannot be recycled by means of a re-extrusion, since the PVDC has a poor compatibility with polypropylene.

For solving the above-mentioned problems, Japanese Patent Publication 3-47177 (1991) discloses a polypropylene stretched film comprising polypropylene and a petroleum resin having no polar group or a terpene resin having no polar group, and having a glass transition temperature (Tg) of 10° to 80° C. However, the water-vapor barrier properties of this film are inferior to the K-OP film, so that it is difficult to apply for the use requiring an extremely high water-vapor barrier property.

The present inventors have made intensive and extensive study to solve the above-mentioned problems, and a result, they have found that a stretched film formed from a polypropylene resin composition comprising a specific crystalline polypropylene having a high stereoregularity and a terpene resin having no polar group and/or a petroleum resin having no polar group has excellent water-vapor barrier properties.

In recent years, a press-through pack packaging (hereinafter sometimes referred to as "PTP packaging") is well used for packaging drugs. The PTP packaging is performed by forming a plurality of recess portions on a plastic sheet by thermoforming, loading a tablet or a capsule into the recess portion, and sealing it with aluminum foil. For such a plastic sheet for the PTP packaging, a rigid vinylchloride resin sheet is conventionally used. However, for a packaging for drugs which readly change quality thereof by humidity, such as antibiotics, the rigid vinylchloride resin sheet are not always sufficient in the water-vapor barrier properties. Therefore, for uses requiring a higher water-vapor barrier properties, a laminate sheet coated with PVDC on the surface of a rigid vinylchloride resin sheet is used. However, there is such a problem that the laminate sheet is expensive. Further, there is such a problem that the rigid vinyl chloride resin and PVDC generate chlorine gas when incinerating.

On the other hand, a sheet made of conventional polypropylene has no problem in the generation of a chlorine gas when incinerating. However, it has problems in transparency and thermoformability, and therefore, the sheet is seldom used for the PTP packaging.

For improving the transparency of the conventional polypropylene sheet, there is known a method in which a nucleating agent such as benzylidene sorbitol is added to the polypropylene. However, this method has such a problem that the thermoformability of the sheet becomes poor when the sheet is applied to PTP packaging. Further, for improving the thermoformability of the conventional polypropylene sheet, there is known a method in which polyethylene is blended to the polypropylene. However, this method has such a problem that the transparency of the sheet is extremely lowered.

The present inventors have made intensive and extensive study to solve the above-mentioned problems. As a result, it has been found that a sheet formed from a polypropylene resin composition comprising a specific crystalline polypropylene having a high stereoregularity and a hydrogenated petroleum resin is excellent in water-vapor barrier properties, as well as rigidity, and transparency, moreover, thermoformability. Based on these findings, the present invention has been accomplished.

OBJECT OF THE INVENTION

It is an object of the present invention to provide a polypropylene resin composition which is capable for giving a film excellent in water-vapor barrier properties, and a polypropylene stretched film and a polypropylene stretched multi-layer film excellent in water-vapor barrier properties. It is another object of the present invention to provide a polypropylene resin composition which is capable for giving a film excellent in water-vapor barrier properties, as well as rigidity and transparency, and a press-through pack packaging polypropylene sheet and a press-through pack packaging polypropylene multi-layer sheet excellent in water-vapor barrier properties, as well as rigidity and transparency.

SUMMARY OF THE INVENTION

The first polypropylene resin composition of the present invention comprises (A) 80 to 95% by weight of a propylene polymer having such properties that:

a melt flow rate (MFR) of said polymer at 230° C. under a load of 2.16 kg is in the range of 0.1 to 500 g/10 min, a pentad isotacticity $[M_5]$ obtained from the following formula (1) using absorption intensity [Pmmmm] and [Pw] in a $^{13}$C-NMR spectrum of a boiled heptane-insoluble component contained in said polymer is in the range of 0.970 to 0.995, a pentad tacticity $[M_3]$ obtained from the following formula (2) using absorption intensity [Pmmrm], [Pmrmr], Pmrrr], [Prmrr], [Prmmr], [Prrrr] and [Pw] in a $^{13}$C-NMR spectrum of a boiled heptane-insoluble component contained in said polymer is in the range of 0.0020 to 0.0050, and a crystallinity of a boiled heptane-insoluble component contained in said polymer is not less than 60%; and (B) 20 to 5% by weight of a terpene resin having no polar group and/or a petroleum resin having no polar group, $$[M_5] = \frac{[Pmmmm]}{[Pw]} \quad (1)$$

wherein

[Pmmmm] is absorption intensity of methyl groups present in the third unit among continuous five propylene units which are bonded to each other with meso form, and

[Pw] is absorption intensity of all methyl groups in a propylene unit;

$$[M_3] = \frac{[Pmmrm] + [Pmrmr] + [Pmrrr] + [Prmrr] + [Prmmr] + [Prrrr]}{[Pw]} \quad (2)$$

wherein

[Pmmrm] is absorption intensity of methyl groups present in the third unit among continuous five propylene units represented by ⊥⊓⊓ in which ⌋ and ⌐ are each a propylene unit,

[Pmrmr] is absorption intensity of methyl groups present in the third unit among continuous five propylene units represented by ⊥⊓⊓ in which ⌋ and ⌐ are each a propylene unit,

[Pmrrr] is absorption intensity of methyl groups present in the third unit among continuous five propylene units represented by ⊥⊓⊓ in which ⌋ and ⌐ are each a propylene unit,

[Prmrr] is absorption intensity of methyl groups present in the third unit among continuous five propylene units represented by ⊓⊓⊓ in which ⌋ and ⌐ are each a propylene unit,

[Prmmr] is absorption intensity of methyl groups present in the third unit among continuous five propylene units represented by ⊓⊓⊐ in which ⌋ and ⌐ are each a propylene unit,

[Prrrr] is absorption intensity of methyl groups present in the third unit among continuous five propylene units represented by ⊓⊓⊓ in which ⌋ and ⌐ are each a propylene unit, and

[Pw] is absorption intensity of all methyl groups in a propylene unit.

The polypropylene stretched film of the present invention is formed from the first polypropylene resin composition, and has a glass transition temperature (Tg) of 0° to 10° C.

The polypropylene multi-layer stretched film of the present invention comprises;

[I] a base layer formed from the first polypropylene resin composition and having a glass transition temperature (Tg) of 0° to 10° C., and

[II] a surface layer formed from a propylene type polymer (C) having such properties that:

a pentad isotacticity $[M_5]$ obtained from the following formula (3) using absorption intensity [Pmmmm], [Pw], [Sαγ], [Sαδ] and [Tδ+δ+] in a $^{13}$C-NMR spectrum of a boiled heptane-insoluble component contained in said copolymer is in the range of 0.925 to 0.975, a pentad tacticity $[M_3]$ obtained from the following formula (4) using absorption intensity [Pmmrm], [Pmrmr], [Pmrrr], [Prmrr], [Prmmr], [Prrrr], [Pw], [Sαγ], [Sαδ+] and [Tδ+δ+] in a $^{13}$C-NMR spectrum of a boiled heptane-insoluble component contained in said copolymer is in the range of 0.0020 to 0.0050, wherein the thickness of the base layer is 80 % or more based on the total thickness of the film, $$[M_5] = \frac{[Pmmmm]}{[Pw] - 2([S\alpha\gamma] + [S\alpha\delta^+]) + 3[T\delta^+\delta^+]} \quad (3)$$

wherein

[Pmmmm] and [Pw] have the same meanings as defined in the aforementioned formula (1),

[Sαγ] is absorption intensity of such secondary carbons that are present in a main chain and out of two kinds of tertiary carbons positioned nearest to said secondary carbons one is situated at the α position and the other is situated at the γ position,

[Sαδ$^+$] is absorption intensity of such secondary carbons that are present in a main chain and out of two kinds of tertiary carbons positioned nearest to said secondary carbons one is situated at the α position and the other is situated at the δ position or farther than the δ position, and

[Tδ$^+$δ$^+$] is absorption intensity of such tertiary carbons that are present in a main chain and out of two kinds of tertiary carbons positioned nearest to said tertiary carbons one is situated at the δ position or farther than the δ position and the other is also situated at the δ position or farther than the δ position;

$$[M_3] = \frac{[Pmmrm] + [Pmrmr] + [Pmrrr] + [Prmrr] + [Prmmr] + [Prrrr]}{[Pw] - 2([S\alpha\gamma] + [S\alpha\delta^+]) + 3[T\delta^+\delta^+]} \quad (4)$$

wherein

[Pmmrm], [Pmrmr], [Pmrrr], [Prmrr], [Prmmr], [Prrrr] and [Pw] have the same meanings as defined in the aforementioned formula (2), and

[Sαγ], [Sαδ$^+$] and [Tδ$^+$δ$^+$] have the same meanings as defined in the above-mentioned formula (3).

In the first polypropylene resin composition, polypropylene stretched film and polypropylene multi-layer stretched film of the present invention, the propylene polymer (A) preferably contains 10–10,000 ppm of polymer comprising constituent units derived from a compound represented by the aforementioned formula (i) or (ii):

$$H_2C=CH-X \quad (i)$$

$$H_2C=CH-CH_2-X \quad (ii)$$

wherein X is a cycloalkyl group, an aryl group or

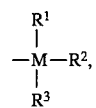

M is carbon or silicon, $R^1$ and $R^2$ are each a hydrocarbon group, and $R^3$ is hydrogen or a hydrocarbon group.

The second polypropylene resin composition according to the present invention comprises:

(A) 70 to 95% by weight of a propylene polymer having such properties that a melt flow rate (MFR) of said polymer at 230° C. under a load of 2.16 kg is in the range of 0.1 to 500 g/10 min, a pentad isotacticity [$M_5$] obtained from the aforesaid formula (1) using absorption intensity [Pmmmm] and [Pw] in a $^{13}$C-NMR spectrum of a boiled heptane-insoluble component contained in said polymer is in the range of 0.970 to 0.995, a pentad tacticity [$M_3$] obtained from the aforesaid formula (2) using absorption intensity [Pmmmr], [Pmrmr], [Pmrrr], [Prmrr], [Pmmmr], [Prrrr] and [Pw] in a $^{13}$C-NMR spectrum of a boiled heptane-insoluble component contained in said polymer is in the range of 0.0020 to 0.0050, and a crystallinity of a boiled heptane-insoluble component contained in said polymer is not less than 60%; and (D) 30 to 5% by weight of a hydrogenated petroleum resin.

The press-through pack packaging polypropylene sheet of the present invention is formed from the second polypropylene resin composition.

The press-through pack packaging polypropylene multi-layer sheet of the present invention comprises:

[I] a base layer formed from the second polypropylene resin composition, and

[II] a surface layer formed from a propylene type polymer (E), wherein the proportion H (%) of the thickness of the base layer based on the total thickness of the sheet T (μm) is 50% or more, and the T (μm) and the H (%) satisfy the relationship represented by the formula:

$$3.4 \leq \log (T \times H) \leq 5.0$$

In the second polypropylene resin composition, press-through pack packaging polypropylene sheet and press-through pack packaging polypropylene multi-layer sheet of the present invention, the propylene polymer (A) preferably contains 10–10,000 ppm of polymer comprising constituent units derived from a compound represented by the aforementioned formula (i) or (ii):

$$H_2C=CH-X \qquad (i)$$

$$H_2C=CH-CH_2-X \qquad (ii)$$

wherein X is a cycloalkyl group, an aryl group or

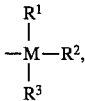

M is carbon or silicon, $R^1$ and $R^2$ are each a hydrocarbon group, and $R^3$ is hydrogen or a hydrocarbon group.

DETAILED DESCRIPTION OF THE INVENTION

The polypropylene resin composition and the use of the same of the present invention are described in detail hereinafter.

The first polypropylene resin composition according to the invention comprises a propylene polymer (A) and a terpene resin having no polar group and/or a petroleum resin having no polar group (B) all described below. Further, the second polypropylene resin composition according to the invention comprises a propylene polymer (A) and a hydrogenated petroleum resin (D) as described later.

The propylene polymer (A), terpene resin having no polar group, petroleum resin having no polar group (B), and hydrogenated petroleum resin (D) of the present invention are successively described hereinafter.

Propylene polymer (A)

The propylene polymer (A) is a homopolymer of propylene, and has a melt flow rate (MFR), as measured at 230° C. under a load of 2.16 kg, of 0.1 to 500 g/10 min, preferably 0.2 to 300 g/10 min.

Measurement of the melt flow rate (MFR) is carried out in accordance with ASTM D1238-65T under the conditions of a temperature of 230° C. and a load of 2.16 kg.

In the propylene polymer of the invention, a pentad isotacticity [$M_5$] obtained from the following formula (1) using absorption intensity [Pmmmm] and [Pw] in a $^{13}$C-NMR spectrum of a boiled heptane-insoluble component contained in the polymer is in the range of 0.970 to 0.995, preferably 0.980 to 0.995, more preferably 0.982 to 0.995.

$$[M_5] = \frac{[Pmmmm]}{[Pw]} \qquad (1)$$

wherein

[Pmmmm] is absorption intensity of methyl groups present in the third unit among continuous five propylene units which are bonded to each other with meso form, and

[Pw] is absorption intensity of all methyl groups in a propylene unit.

The pentad isotacticity [$M_5$] used for evaluating the stereoregularity of the boiled heptane-insoluble component contained in the propylene polymer (A) and the propylene type polymer (C) as described later used in the invention is concretely described below.

The pentad isotacticity [$M_5$] of a polymer can be determined from the absorption intensity in a $^{13}$C-NMR spectrum of a boiled heptane-insoluble component contained in the polymer.

When the boiled heptane-insoluble component is a homopolymer of propylene, this insoluble component can be expressed by the following formula (A):

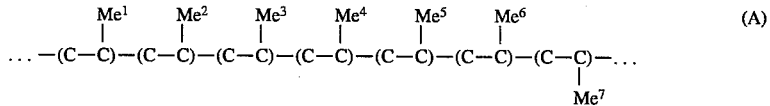

If a propylene unit

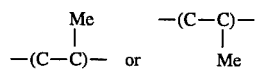

is symbolized by ⌐ or ¬, ⌐⌐ is expressed by "m" (meso form), and ⌐¬ is expressed by "r" (racemo form), continuous five propylene isotactic units are expressed by ⌐m⌐m⌐m⌐m⌐. When absorption intensity, in a $^{13}$C-NMR spectrum, of methyl groups (e.g., Me$^3$ Me$^4$) in the third unit among the continuous five propylene units which are bonded to each other with meso form is expressed by [Pmmmm], and absorption intensity of the whole methyl groups (e.g., $Me^1$, $Me^2$, $Me^3$ ...) in the propylene units is expressed by [Pw], the stereoregularity of the boiled heptane-insoluble component represented by the above formula (A) can be evaluated by a ratio of [Pmmmm] to [Pw], namely a value of [$M_5$] obtained from the following formula (1).

Accordingly, the stereoregularity of the boiled heptane-insoluble component in the propylene polymer (A) of the invention can be evaluated by a value of the pentad isotacticity [$M_5$] obtained from the above formula (1) using the absorption intensity [Pmmmm] and [Pw] in a $^{13}$C-NMR spectrum of the boiled heptane-insoluble component.

Further, when the boiled heptane-insoluble component contains constituent units derived from other olefins than propylene, for example, ethylene units, in a small amount, said insoluble component can be expressed by the following formula (B-i) or (B-2). The formula (B-1) shows that one ethylene unit is contained in a propylene unit chain, and the formula (B-2) shows that an ethylene unit chain composed of two or more ethylene units is contained in a propylene unit chain.

($C^1$ or $C^3$) that said secondary carbon is present in a main chain and out of two tertiary carbons positioned nearest to said secondary carbon one ($C^a$ or $C^b$) is situated at the $\gamma$ position and the other ($C^b$ or $C^a$) is situated at the 7 position.

When the boiled heptane-insoluble component is represented by the formula (B-2), absorption intensity ($S\alpha\delta^+$), in the $^{13}$C-NMR spectrum, of a secondary carbon ($C^4$) which is in the ethylene unit chain composed of two or more ethylene units and bonded to a tertiary carbon ($C^d$) in the propylene unit and absorption intensity ($S\alpha\delta^+$) of a secondary carbon ($C^6$) which is in the propylene unit and bonded to a secondary carbon ($C^5$) in the ethylene unit chain composed of two or more ethylene units are excluded.

In other words, the absorption intensity of other methyl groups ($Me^4$, $Me^5$, $Me^6$ and $Me^7$) than the methyl groups in the third unit among the continuous five isotactic propylene units are excluded by subtracting, from Pw, two times value of the absorption intensity [$S\alpha\delta^+$] of such a secondary carbon ($C^4$ or $C^6$) that said secondary carbon is present in a main chain and out of two tertiary carbons positioned nearest to said secondary carbon one ($C^d$ or $C^e$) is situated at the $\alpha$ position and the other ($C^e$ or $C^d$) is situated at the $\delta$ position or farther than the $\delta$ position.

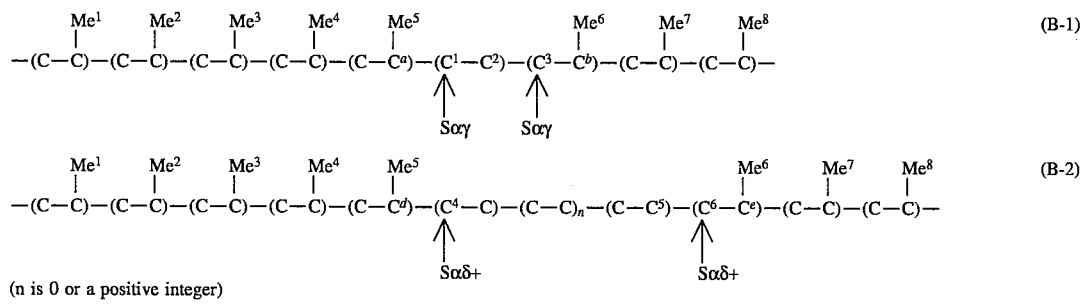

(n is 0 or a positive integer)

In the above cases, for measurement of the pentad isotacticity, the absorption intensity of other methyl groups ($Me^4$, $Me^5$, $Me^6$ and $Me^7$ in the formulas (B-1) and (B-2)) than the methyl group in the third unit among the continuous five isotactic propylene units should be theoretically excluded. However, absorption of these methyl groups are observed to be overlapped on absorption of other methyl groups, and hence it is difficult to quantitatively determine the absorption intensity of those methyl groups.

Accordingly, the stereoregularity of the boiled heptane-insoluble component represented by the above formula (B-1) or (B-2) can be evaluated by a value obtained from the following formula (1B).

$$\frac{[Pmmmm]}{[Pw] - 2([S\alpha\gamma] + [S\alpha\delta^+])} \qquad (1B)$$

When the boiled heptane-insoluble component contains a small amount of ethylene units and the ethylene unit chain contains one propylene unit, this insoluble component can be represented by the following formula (C).

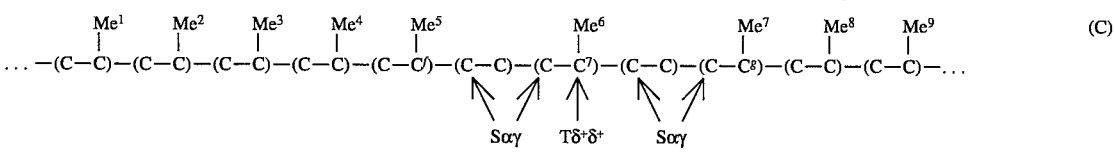

On that account, when the boiled heptane-insoluble component is represented by the formula (B-1), absorption intensity ($S\alpha\gamma$), in the $^{13}$C-NMR spectrum, of a secondary carbon ($C^1$) which is in the ethylene unit and bonded to a tertiary carbon ($C^a$) in the propylene unit and absorption intensity ($S\alpha\gamma$) of a secondary carbon ($C^3$) which is in the propylene unit and bonded to the secondary carbon ($C^2$) in the ethylene unit are excluded.

In other words, the absorption intensity of other methyl groups ($Me^4$, $Me^5$, $Me^6$ and $Me^7$) than the methyl groups in the third unit among the continuous five isotactic propylene units are excluded by subtracting, from Pw, two times value of the absorption intensity ($S\alpha\gamma$) of such a secondary carbon If the aforementioned formula (1B) is applied to the above case, a further correction should be carried out. The reason is that there are four methyl groups corresponding to $S\alpha\gamma$ or $S\alpha\delta^+$ in spite that the number of the methyl groups to be excluded is five ($Me^4$, $Me^5$, $Me^6$, $Me^7$ and $Me^8$), and hence if the formula (1B) is applied, the number of the excluded methyl groups is larger by three than the number of other methyl groups than the methyl group in the third unit among the continuous five propylene units.

Accordingly, a further correction is made by using absorption intensity, in the $^{13}$C-NMR spectrum, of a tertiary carbon in the propylene unit contained in the ethylene unit chain. In other words, the correction is made by adding, to Pw, a value of three times of absorption intensity [Tδ⁺δ⁺] of such a tertiary carbon (C⁷) that said tertiary carbon is present in a main chain and out of two tertiary carbons (C⁷, C⁸) positioned nearest to said tertiary carbon one (C⁷) is situated at the δ position or farther than the δ position and the other (C⁸) is also situated at the δ position or farther than the δ position.

Thus, the stereoregularity of the boiled heptane-insoluble component represented by the above formula (C) can be evaluated by a value of the pentad isotacticity [M₅] obtained from the following formula (3).

Accordingly, the stereoregularity of the boiled heptane-insoluble component in the propylene type polymer as described hereinafter of the invention can be evaluated by a value of the pentad isotacticity [M₅] obtained from the following formula (3).

$$[M_5] = \frac{[Pmmmm]}{[Pw] - 2([S\alpha\gamma] + [S\alpha\delta^+]) + 3[T\delta^+\delta^+]} \quad (3)$$

wherein

[Pmmmm] and [Pw] have the same meanings as defined in the above formula (1),

[Sαγ] is absorption intensity of such secondary carbons that are present in a main chain and out of two kinds of tertiary carbons positioned nearest to said secondary carbons one is situated at the α position and the other is situated at the γ position,

[Sαδ⁺] is absorption intensity of such secondary carbons that are present in a main chain and out of two kinds of tertiary carbons positioned nearest to said secondary carbons one is situated at the α position and the other is situated at the δ position or farther than the δ position, and Tδ⁺δ⁺] is absorption intensity of such tertiary carbons that are present in a main chain and out of two kinds of tertiary carbons positioned nearest to said tertiary carbons one is situated at the δ position or farther than the δ position and the other is also situated at the δ position or farther than the δ position.

The formula (1) and the formula (1B) are not different from the formula (3), and they can be said to be special cases of the formula (3). Further, the above-mentioned correction may become unnecessary depending on the kind of constitution unit other than propylene which is contained in the boiled heptane-insoluble components.

In the propylene polymer (A) to be used in the present invention, the pentad isotacticity [M₅] of the boiled heptane-insoluble component obtained from the above formula (1) is in the range of 0.970 to 0.995, and a pentad tacticity [M₃] obtained from the following formula (2) using absorption intensity [Pmmrm], [Pmrmr], [Pmrrr], [Prmrr], [Prmmr], [Prrrr] and [Pw] in a ¹³C-NMR spectrum of the boiled heptane-insoluble component is in the range of 0.0020 to 0.0050, preferably 0.0023 to 0.0045, more preferably 0.0025 to 0.0040.

$$[M_3] = \frac{[Pmmrm] + [Pmrmr] + [Pmrrr] + [Prmrr] + [Prmmr] + [Prrrr]}{[Pw]} \quad (2)$$

wherein

[Pmmrm] is absorption intensity of methyl groups present in the third unit among continuous five propylene units represented by ⊔⊓ in which ⌋ and ⌐ are each a propylene unit,

[Pmrmr] is absorption intensity of methyl groups present in the third unit among continuous five propylene units represented by ⊔⊓⊔ in which ⌋ and ⌐ are each a propylene unit,

[Pmrrr] is absorption intensity of methyl groups present in the third unit among continuous five propylene units represented by ⊔⊓ in which ⌋ and ⌐ are each a propylene unit,

[Prmrr] is absorption intensity of methyl groups present in the third unit among continuous five propylene units represented by ⊔⊓⊔ in which ⌋ and ⌐ are each a propylene unit,

[Prmmr] is absorption intensity of methyl groups present in the third unit among continuous five propylene units represented by ⊔⊔⊔ in which ⌋ and ⌐ are each a propylene unit,

[Prrrr] is absorption intensity of methyl groups present in the third unit among continuous five propylene units represented by ⊓⊔⊓ in which ⌋ and ⌐ are each a propylene unit, and

[Pw] is absorption intensity of all methyl groups in a propylene unit.

When the boiled heptane-insoluble component is a homopolymer of propylene, a value of the pentad tacticity [M₃] can be determined by the above formula (2). When the boiled heptane-insoluble component contains a small amount of monomer units other than propylene units, a value of the pentad tacticity [M3] can be determined by the following formula (4).

$$[M_3] = \frac{[Pmmrm] + [Pmrmr] + [Pmrrr] + [Prmrr] + [Prmmr] + [Prrrr]}{[Pw] - 2([S\alpha\gamma] + [S\alpha\delta^+]) + 3[T\delta^+\delta^+]} \quad (4)$$

wherein [Pmmrm], [Pmrmr], [Pmrrr], [Prmrr], [Prmmr] and [Prrrr] have the same meanings as defined in the formula (2), and [Pw], [Sαγ], [Sαδ⁺] and [Tδ⁺δ⁺] have the same meanings as defined in the formula (3).

In the formula (2) and the formula (4), each of [Pmmrm], [Pmrmr], [Pmrrr], [Prmrr], [Prmmr] and [Prrrr] shows absorption intensity of a methyl group in the third unit among continuous five propylene units having such a structure that three out of five methyl groups in the continuous five propylene units are the same in the direction and the residual two are different in the direction (sometimes referred to as "M₃ structure" hereinafter). That is, the value of the pentad tacticity [M₃] obtained from the above formula (2) exhibits a proportion of the M₃ structure in the propylene unit chain, while the value of the pentad tacticity [M₃] obtained from the above formula (4) exhibits a proportion of the M₃ structure in the propylene unit chain containing a small amount of other monomer units than the propylene units.

The propylene polymer (A) to be used in the present invention has an extremely long mesochain (i.e., propylene unit chain in which directions of α-methyl carbons are the same as each other), because the value of the pentad isotacticity [M₅] of the boiled heptane-insoluble component obtained from the formula (1) is in the range of 0.970 to 0.995, and the value of the pentad tacticity [M₃] of the boiled heptane-insoluble component obtained from the formula (2) is in the range of 0.0020 to 0.0050.

In general, polypropylene has a longer mesochain as the value of the pentad tacticity [M₃] becomes smaller. However, when the value of the pentad isotacticity [M₅] is extremely large and the value of the pentad tacticity [M₃] is extremely small, polypropylene having a larger value of the pentad tacticity [M₃] sometimes has a longer mesochain with the proviso that the pentad isotacticity [M₅] is almost the same.

For example, when polypropylene having the following structure (a) is compared with polypropylene having the following structure (b), the polypropylene represented by the structure (a) having the M₃ structure has a longer mesochain than the polypropylene represented by the structure (b) not having the M₃ structure. (Each of the following structures (a) and (b) is composed of 1,003 propylene units.)

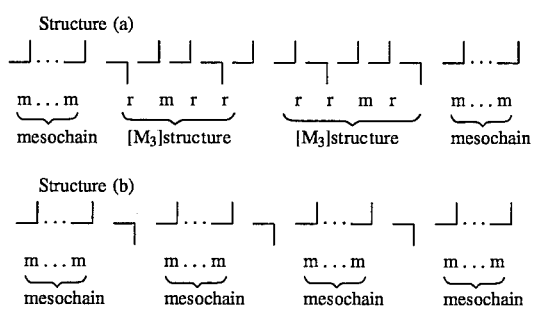

The pentad isotacticity [$M_5$] of polypropylene represented by the structure (a) is 0.986, and the pentad isotacticity [$M_5$] of polypropylene represented by the structure (b) is 0.985, so that those values are almost the same. However, in the polypropylene represented by the structure (a) having the $M_3$ structure, the number of propylene units contained in the mesochain is 497 on an average, while in the polypropylene represented by the structure (b) not having the $M_3$ structure, the number of propylene units contained in the mesochain is 250 on an average. That is, in the polypropylene having an extremely large value of the pentad isotacticity [$M_5$], a proportion of the structure represented by "r" (racemo) contained in the propylene unit chain becomes extremely small. Hence, the polypropylene wherein structures represented by "r" (racemo) are concentrated (i.e., polypropylene having the $M_3$ structure) has a longer mesochain as compared with the polypropylene wherein structures represented by "r" (racemo) are scattered (i.e., polypropylene not having the $M_3$ structure).

The propylene polymer (A) to be used in the present invention is a highly crystalline polypropylene having the $M_3$ structure represented by the above structure (a), and in this polymer, the pentad isotacticity [$M_5$] of the boiled heptane-insoluble component is in the range of 0.970 to 0.995, and the pentad tacticity [$M_3$] of the boiled heptane-insoluble component is in the range of 0.0020 to 0.0050. Such propylene polymer of the invention has higher rigidity, heat resistance and moisture resistance than those of the conventional highly crystalline polypropylene, though the reason has not been clarified. If the pentad tacticity [$M_3$] of the boiled heptane-insoluble component is out of the range of 0.0020 to 0.0050, the above-mentioned properties are sometimes deteriorated.

In the invention, the boiled heptane-insoluble component is prepared as follows. In a 1-liter flask equipped with a stirring device is charged 3 g of a polymer sample, 20 mg of 2,6-di-tert-butyl-4-methylphenol and 500 ml of n-decane, and the flask is heated in an oil bath of 145° C. to dissolve the polymer sample. After the polymer sample is dissolved, the flask is cooled to room temperature over about 8 hours and then kept for 8 hours in a water bath of 23° C. The n-decane suspension containing the precipitated polymer (23° C.-decane-insoluble component) is filtered on a glass filter of G-4 (or G-2) and dried under a reduced pressure. Then, 1.5 g of the polymer is subjected to Soxhlet extraction for not shorter than 6 hours using heptane. Thus, a boiled heptane-insoluble component as a test sample is obtained.

The amount of the boiled heptane-insoluble component in the propylene polymer of the invention is usually not less than 80% by weight, preferably not less than 90% by weight, more preferably not less than 94% by weight, much more preferably not less than 95% by weight, particularly preferably not less than 96% by weight.

The amount of the boiled heptane-insoluble component is determined on the assumption that the 23° C.-decane-soluble component is also soluble in the boiled heptane.

In the invention, the NMR measurement of the boiled heptane-insoluble component is carried out, for example, in the following manner. That is, 0.35 g of the boiled heptane-insoluble component is dissolved in 2.0 ml of hexachlorobutadiene under heating.. The resulting solution is filtered over a glass filter (G2), to the filtrate is added 0.5 ml of deuterated benzene, and the mixture is charged in a NMR tube having an inner diameter of 10 mm. Then, $^{13}$C-NMR measurement is conducted at 120° C. using a NMR measuring apparatus (GX-500 type produced by Japan Electron Co., Ltd). The number of integration times is not less than 10,000. The values of the pentad isotacticity [$M_5$] and the pentad tacticity [$M_3$] can be sought from peak intensity based on each structure obtained by the abovementioned measurement or the sum of the peak intensity.

The boiled heptane-insoluble component in the propylene polymer (A) used in the invention has a crystallinity of usually not less than 60%, preferably not less than 65%, more preferably not less than 70%.

The crystallinity can be determined as follows. A sample is molded into an angular plate having a thickness of 1 mm by means of a pressure molding machine of 180° C., and immediately the plate is water cooled to obtain a pressed sheet. Using this pressed sheet, the crystallinity is measured by a measuring device (Rotor Flex RU300 produced by Rigaku Denki K.K., output: 50kV, 250 mA). In this measurement, a transmission method is utilized, and the measurement is conducted while rotating the sample.

The propylene polymer (A) to be used in the present invention preferably contains polymer comprising constituent units derived from a compound represented by the following formula (i) or (ii) in an amount of 10 to 10,000 ppm, more 100 to 5,000 ppm.

$$H_2C=CH-X \qquad (i)$$

$$H_2C=CH-CH_2-X \qquad (ii)$$

wherein X is a cycloalkyl group, an aryl group or

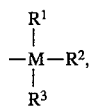

M is carbon or silicon, $R^1$ and $R^2$ are each a hydrocarbon group, and $R^3$ is hydrogen or a hydrocarbon group.

Examples of the cycloalkyl group indicated by X in the above formula (i) or (ii) include a cyclopentyl group, cyclohexyl group, a cycloheptyl group, and examples of the aryl group indicated by X is a phenyl group, a tolyl group, a xylyl group and a naphthyl group.

Examples of the hydrocarbon group indicated by $R^1$, $R^2$ or $R^3$ in the above formula (i) or (ii) include an alkyl group such as a methyl group, an ethyl group, a propyl group and a butyl group; an aryl group such as a phenyl group and a naphthyl group; and a norbornyl group. Further the hydrocarbon group indicated by $R^1$, $R^2$ or $R^3$ may contain silicon and halogen.

Concrete examples of the compound represented by the formula (i) or (ii) include 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, allylnaphthalene, allylnorbornane, styrene, dimethylstyrenes, vinylnaphthalenes, allyltoluenes, allylbenzene, vinylcyclohexane, vinylcyclopentane, vinylcycloheptane and allyltrialkylsilanes. Of these, preferred are 3-methyl-1-butene, 3-methyl-1-pentene, 3-ethyl-1-hexene, vinylcyclohexane, allyltrimethylsilane and dimethylstyrene. More preferred are 3-methyl-1-butene, vinylcyclohexane and allyltrimethylsilane. Particularly preferred is 3-methyl-1-butene.

Further, the propylene polymer to be used in the present invention may contain constituent units derived from olefins having 20 or less carbon atoms other than propylene in a small amount or may contain constituent units derived from diene compounds having 4 to 20 carbon atoms in a small amount.

If the propylene polymer contains a monomer component other than propylene in a small amount, the values of the above-described pentad isotacticity [$M_5$] and the pentad tacticity [$M_3$] are not substantially affected thereby.

The propylene polymer to be used in the present invention desirably has a density of 0.900 to 0.936 g/cm³, preferably 0.910 to 0.936 g/cm³.

In the propylene polymer to be used in the present invention, it is desired that the amount of the 23° C.—decane-soluble component is not more than 3.0%, preferably not more than 2.5%, more preferably not more than 2.0%, particularly preferably not more than 1.5%.

The amount of the 23° C.-decane-soluble component in the propylene polymer is measured as follows. In a 1-liter flask equipped with a stirring device is charged 3 g of a polymer sample, 20 mg of 2,6-di-tert-butyl-4-methylphenol and 500 ml of n-decane, and the flask is heated in an oil bath of 145° C. to dissolve the polymer sample. After the polymer sample is dissolved, the flask is cooled to room temperature over about 8 hours and then kept for 8 hours in an water bath of 23° C. The n-decane suspension containing the precipitated polymer and the dissolved polymer is separated by filtration on a glass filter of G-4 (or G-2). The resulting solution is dried at 150° C. and 10 mmHg until its weight becomes unvaried, and the weight is measured. The weight thus measured is the amount of the polymer component soluble in the above-mentioned mixture solvent, and the amount is calculated as percentage to the weight of the sample polymer.

The boiled heptane-insoluble component in the propylene polymer to be used in the present invention desirably has a semi-crystallization period at 135° C. of not longer than 500 seconds, preferably not longer than 100 seconds, more preferably not longer than 80 seconds, particularly preferably not longer than 70 seconds.

The semi-crystallization period at 135° C. of the boiled heptane-insoluble component in the propylene polymer is measured as follows. That is, a relation between the exotherm caused by the crystallization at 135° C. of the boiled heptane-insoluble component of the polymer and the period required for the crystallization is measured by the use of a differential calorimeter (produced by Perkin Elmer Co.), and the period of time necessary for the exotherm to reach 50% of the whole exotherm is determined as the semi-crystallization period.

In the propylene polymer to be used in the present invention, it is desired that a difference between the melting point of the boiled heptane-insoluble component and the crystallization temperature thereof is not more than 45° C., preferably not more than 43° C., particularly preferably not more than 40° C.

The propylene polymer to be used in the present invention preferably has an intrinsic viscosity [η], as measured in decalin at 135° C., of usually 0.001 to 30 dl/g, more preferably 0.01 to 10 dl/g, particularly preferably 0.05 to 8 dl/g.

The propylene polymer to be used in the present invention mentioned as above can be prepared, for example, by a process comprising polymerizing propylene in the presence of a catalyst for olefin polymerization formed from:

[Ia] a solid titanium catalyst component (a) containing magnesium, titanium, halogen and an electron donor as essential components;

[II] an organometallic catalyst component (b); and

[III] a silicon compound (c) represented by the following formula (iii) or a compound (d) having at least two ether linkages existing via plurality of atoms:

$$R^a_n\text{-Si-}(OR^b)_{4-n} \qquad (iii)$$

wherein, n is 1, 2 or 3; when n is 1, $R^a$ is a secondary or a tertiary hydrocarbon group; when n is 2 or 3, at least one of $R^a$ is a secondary or a tertiary hydrocarbon group, $R^a$ may be the same or different, and $R^b$ is a hydrocarbon group of 1 to 4 carbon atoms; and when 4-n is 2 or 3, $R^b$ may be the same or different.

The olefin polymerization catalyst used in the above process is preferably formed from:

[Ib] a prepolymerized catalyst obtained by prepolymerizing at least one olefin selected from olefins represented by the following formula (i) or (ii) in the presence of (a) a solid titanium catalyst component containing magnesium, titanium, halogen and an electron donor as essential components and (b) an organometallic catalyst component;

$$H_2C=CH-X \qquad (i)$$

$$H_2C=CH-CH_2-X \qquad (ii)$$

wherein X is a cycloalkyl group, an aryl group or

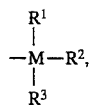

M is carbon or silicon, $R^1$ and $R^2$ are each a hydrocarbon group, and $R^3$ is hydrogen or a hydrocarbon group;

[II] the organometallic catalyst component (b); and

[III] the silicon compound (c) represented by the above-mentioned formula (iii) or the compound (d) having at least two ether linkages existing via plurality of atoms.

Each component for forming the olefin polymerization catalyst used for preparing the propylene polymer to be used in the present invention are described in detail hereinafter.

The solid titanium catalyst component (a) can be prepared by bringing a magnesium compound, a titanium compound and an electron donor described below into contact with each other.

The titanium compound used for preparing the solid titanium catalyst component (a) is, for example, a tetravalent titanium compound represented by the following formula:

$$Ti(OR)_g X_{4-g}$$

wherein R is a hydrocarbon group, X is a halogen atom, and g is a number satisfying the condition of $0 \leq g \leq 4$.

Concrete examples of the titanium compounds include:
titanium tetrahalide such as $TiCl_4$, $TiBr_4$ and $TiI_4$;
alkoxytitanium trihalide such as $Ti(OCH_3)Cl_3$, $Ti(OC_2H_5)Cl_3$, $Ti(On\text{-}C_4H_9)Cl_3$, $Ti(OC_2H_5)Br_3$ and $Ti(O\text{-iso-}C_4H_9)Br_3$;
dialkoxytitanium dihalide such as $Ti(OCH_3)_2Cl_2$, $Ti(OC_2H_5)_2Cl_2$, $Ti(On\text{-}C_4H_9)_2Cl_2$ and $Ti(OC_2H_5)_2Br_2$;

trialkoxytitanium monohalide such as Ti $(OCH_3)_3Cl$, Ti $(OC_2H_5)_3Cl$, Ti $(On-C_4H_9)_3Cl$ and Ti $(OC_2H_5)_3Br$; and tetraalkoxytitanium such as Ti $(OCH_3)_4$, Ti $(OC_2H_5)_4$, Ti $(On-C_4H_9)_4$, Ti $(O-iso-C_4H_9)_4$ and Ti (O-2-ethylhexyl).

Of the above-exemplified compounds, preferred are halogen-containing compounds, more preferred are titanium tetrahalides, and particularly preferred is titanium tetrachloride. These titanium compounds may be used singly or in combination. Further, they may be diluted in hydrocarbon compounds or halogenated hydrocarbon compounds.

The magnesium compound used for preparing the solid titanium catalyst component (a) includes a magnesium compound having reduction properties and a magnesium compound having no reduction properties.

The magnesium compound having reduction properties is, for example, a magnesium compound having a magnesium-to-carbon bond or a magnesium-to-hydrogen bond. Concrete examples of the magnesium compound having reduction properties include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxylmagnesium, ethylbutylmagnesium and butylmagnesium hydride. These magnesium compounds may be used singly or may be used in combination with organometallic compounds described later to form complex compounds. Further, these magnesium compounds may be liquid or solid, and may be derived by causing metallic magnesium to react with a compound corresponding to the metallic magnesium. Furthermore, they may be derived from metallic magnesium by the above method during the preparation of the catalyst.

Concrete examples of the magnesium compound having no reduction properties include magnesium halide such as magnesium chloride, magnesium bromide, magnesium iodide and magnesium fluoride; alkoxymagnesium halide such as methoxylmagnesium chloride, ethoxymagnesium chloride, isopropoxymagnesium chloride, butoxymagnesium chloride and octoxymagnesium chloride; allyloxymagnesium halide such as phenoxymagnesium chloride and methylphenoxymagnesium chloride; alkoxymagnesium such as ethoxymagnesium, isopropoxymagnesium, butoxymagnesium, n-octoxymagnesium and 2-ethylhexoxymagnesium; allyloxymagnesium such as phenoxymagnesium and dimethylphenoxymagnesium; and magnesium carboxylate such as magnesium laurate and magnesium stearate.

These magnesium compounds having no reduction properties may be those derived from the above-mentioned magnesium compounds having reduction properties or those derived during the catalyst component preparation stage. In order to derive the magnesium compound having no reduction properties from the magnesium compound having reduction properties, the magnesium compound having reduction properties is brought into contact with halogen, a polysiloxane compound, a halogen-containing silane compound, a halogen-containing aluminum compound, a compound having an active carbon-to-oxygen bond such as alcohol, ester, ketone and aldehyde.

As the magnesium compound, there can be used complex compounds or composite compounds of the above-mentioned magnesium compounds having or not having reduction properties with other metals, or mixtures of the above-mentioned magnesium compounds having or not having reduction properties with other metallic compounds. Further, these compounds may be used in combination of two or more kinds.

Other various magnesium compounds than the above-mentioned ones can be used for preparing the solid titanium catalyst component (a), but it is preferred that the magnesium compound takes a form of a halogen-containing magnesium compound in the solid titanium catalyst component (a) finally obtained. Accordingly, if a magnesium compound containing no halogen is used, the compound is preferably brought into contact with a halogen-containing compound in the course of the catalyst preparation.

Of the above-mentioned magnesium compounds, preferred are magnesium compounds having no reduction properties. More preferred are halogen-containing magnesium compounds. Particularly preferred are magnesium chloride, alkoxymagnesium chloride and allyloxymagnesium chloride.

The solid titanium catalyst component (a) used in the invention is formed by bringing such a magnesium compound as mentioned above into contact with the aforesaid titanium compound and an electron donor.

Concrete examples of the electron donor employable for preparing the solid titanium catalyst component (a) include:

amines such as methylamine, ethylamine, dimethylamine, diethylamine, ethylenediamine, tetramethylenediamine, hexamethylenediamine, tributylamine and tribenzylamine;

pyrroles such as pyrrole, methylpyrrole and dimethylpyrrole;

pyrroline;

pyrrolidine;

indole;

pyridines such as pyridine, methylpyridine, ethylpyridine, propylpyridine, dimethylpyridine, ethylmethylpyridine, trimethylpyridine, phenylpyridine, benzylpyridine and pyridine chloride;

nitrogen-containing cyclic compounds such as piperidines, quinolines and isoquinolines;

oxygen-containing cyclic compounds such as tetrahydrofuran, 1,4-cineol, 1,8-cineol, pinolfuran, methylfuran, dimethylfuran, diphenylfuran, benzofuran, coumaran, phthalan, tetrahydropyran, pyran and dihydropyran;

alcohols of 1 to 18 carbon atoms such as methanol, ethanol, propanol, pentanol, hexanol, octanol, 2-ethylhexanol, dodecanol, octadecyl alcohol, oleyl alcohol, benzyl alcohol, phenylethyl alcohol, cumyl alcohol, isopropyl alcohol and isopropylbenzyl alcohol;

phenols of 6 to 20 carbon atoms which may have lower alkyl group such as phenol, cresol, xylenol, ethylphenol, propylphenol, nonylphenol, cumylphenol and naphthol;

ketones of 3 to 15 carbon atoms such as acetone, methyl ethyl ketone, methyl isobutyl ketone, acetophenone, benzophenone, acetylacetone and benzoquinone;

aldehydes of 2 to 15 carbon atoms such as acetaldehyde, propionaldehyde, octylaldehyde, benzaldehyde, tolualdehyde and naphthaldehyde;

organic esters of 2 to 30 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, n-butyl maleate, diisobutyl methylmalonate, di-n-hexyl cyclohexenecarboxylate, diethyl nadiate, diisopropyl tetrahydrophthalate, diethyl phthalate, diisobutyl phthalate, di-n-butyl phthalate, di-2-ethylhexyl phthalate, γ-butyrolactone, δ-valerolactone, coumarin, phthalide and ethyl carbonate;

acid halides of 2 to 15 carbon atoms such as acetylchloride, benzoylchloride, toluic acid chloride and anisic acid chloride;

ethers of 2 to 20 carbon atoms such as methyl ether, ethyl ether, isopropyl ether, butyl ether, amyl ether, anisole and diphenyl ether epoxy-p-menthane;

diethers such as 2-isopentyl-2-isopropyl-1,3-dimethoxypropane, 2,2-isobutyl-1,3-dimethoxypropane, 2,2-isoproyl- 1,3-dimethoxypropane, 2-cyclohexylmethyl-2-isopropyl- 1,3-dimethoxypropane, 2,2-isopentyl-1,3-dimethoxypropane, 2-isobutyl-2-isopropyl-1,3-dimethoxypropane, 2-cyclohexyl-2-isopropyl-1,3-dimethoxypropane, 2-cyclopentyl-2-isopropyl-1,3-dimethoxypropane, 2,2 -dicyclopentyl-1,3-dimethoxypropane, 1,2 -bis-methoxymethyl-bicyclo-[2,2,1] -heptane, diphenyldimethoxysilane, isopropyl-t-butyldimethoxysilane, 2,2-diisobutyl-1,3-dimethoxycyclohexane and 2-isopentyl-2-isopropyl- 1,3-dimethoxycylohexane;

- acid amides such as acetic acid amide, benzoic acid amide and toluic acid amide;
- nitriles such as acetonitrile, benzonitrile and tolunitrile; and
- acid anhydrides such as acetic anhydride, phthalic anhydride and benzoic anhydride.

Also employable as the electron donor is a silicon compound represented by the formula (iii) described later.

When the titanium compound, the magnesium compound and the electron donor are brought into contact with each other, a carrier compound may be used to prepare a solid titanium catalyst component (a) supported on a carrier.

Examples of the carrier compounds include $Al_2O_3$, $SiO_2$, $B_2O_3$, MgO, CaO, $TiO_2$, ZnO, $ZnO_2$, $SnO_2$, BaO, ThO and resins such as a styrene/divinylbenzene copolymer. Of these carrier compounds, preferred are $SiO_2$, $Al_2O_3$, MgO, ZnO and $ZnO_2$.

The above-mentioned components may be brought into contact with each other in the presence of a reaction agent such as silicon, phosphorus and aluminum.

The solid titanium catalyst component (a) is prepared by bringing the aforementioned titanium compound, magnesium compound and the electron donor into contact with each other by known methods.

Examples of the processes for preparing the solid titanium catalyst component (a) are briefly described below.

(1) A process comprising bringing a solution consisting of a magnesium compound, an electron donor and a hydrocarbon solvent into contact with an organometallic compound, after or simultaneously .with precipitating a solid by bringing the solution into contact with a titanium compound.

(2) A process comprising bringing a complex composed of a magnesium compound and an electron donor into contact with an organometallic compound, and then bringing the reaction product into contact with a titanium compound.

(3) A process comprising bringing a product obtained by the contact of an inorganic carrier and an organic magnesium compound into contact with a titanium compound. In this case, the above product may be beforehand brought into contact with a halogen-containing compound, an electron donor and/or an organometallic compound.

(4) A process comprising obtaining an inorganic or organic carrier on which a magnesium compound is supported from a mixture of an inorganic or organic carrier and a solution containing a magnesium compound and an electron donor (and further a hydrocarbon solvent in some cases), and then bringing the obtained carrier into contact with a titanium compound.

(5) A process comprising bringing a solution containing a magnesium compound, a titanium compound and an electron donor (and further a hydrocarbon solvent in some cases) into contact with an inorganic or organic carrier to obtain a solid titanium catalyst component on which magnesium and titanium are supported.

(6) A process comprising bringing a liquid organic magnesium compound into contact with a halogen-containing titanium compound. In this case, an electron donor is used at least one time.

(7) A process comprising bringing a liquid organic magnesium compound into contact with a halogen-containing compound, and then bringing the product thus obtained into contact with a titanium compound. In this case, an electron donor is used at least one time (8) A process comprising bringing an alkoxy group-containing magnesium compound into contact with a halogen-containing titanium compound. In this case, an electron donor is used at least one time (9) A process comprising bringing a complex composed of an alkoxy group-containing magnesium compound and an electron donor into contact with a titanium compound.

(10) A process comprising bringing a complex composed of an alkoxy group-containing magnesium compound and an electron donor into contact with an organometallic compound, and then bringing the product thus obtained into contact with a titanium compound.

(11) A process comprising bringing a magnesium compound, an electron donor and a titanium compound into contact with each other in an optional order. In this reaction, each components may be pretreated with an electron donor and/or a reaction assistant such as an organometallic compound or a halogen-containing silicon compound. In this case, an electron donor is preferably used at least one time

(12) A process comprising bringing a liquid magnesium compound not having reducing ability into contact with a liquid titanium compound, if necessary in the presence of an electron donor, to precipitate a solid magnesium/titanium complex compound.

(13) A process comprising further bringing the reaction product obtained in the above process (12) into contact with an titanium compound.

(14) A process comprising further bringing the reaction product obtained in the above process (11) or (12) into contact with an electron donor and a titanium compound.

(15) A process comprising pulverizing a magnesium compound and a titanium compound (and if necessary an electron donor) to obtain a solid product, and treating the solid product with either halogen, a halogen compound or aromatic hydrocarbon. This process may include a step of pulverizing only a magnesium compound, a step of pulverizing a complex compound composed of a magnesium compound and an electron donor, or a step of pulverizing a magnesium compound and a titanium compound. Further, after the pulverization, the solid product may be subjected to a pretreatment with a reaction assistant and then subjected to a treatment with halogen or the like. Examples of the reaction assistants include an organometallic compound and a halogen-containing silicon compound.

(16) A process comprising pulverizing a magnesium compound, and then bringing the pulverized magnesium compound into contact with a titanium compound. In this case, an electron donor or a reaction assistant may be used in the pulverization stage and/or the contacting reaction stage.

(17) A process comprising treating the compound obtained in any of the above processes (11) to (16) with halogen, a halogen compound or aromatic hydrocarbon.

(18) A process comprising bringing the reaction product obtained by the contact of a metal oxide, an organic magnesium compound and a halogen-containing compound into contact with a titanium compound and if necessary an electron donor.

(19) A process comprising bringing a magnesium compound such as a magnesium salt of organic acid, alkoxymagnesium or aryloxymagnesium into contact with a titanium compound and/or halogen-containing hydrocarbon and if necessary an electron donor.

(20) A process comprising bringing a hydrocarbon solution containing at least a magnesium compound and alkoxytitanium into contact with a titanium compound and/or an electron donor. In this case, a halogen-containing compound such as a halogen-containing silicon compound may be further brought into contact therewith, if necessary.

(21) A process comprising bringing a liquid magnesium compound not having reducing ability into contact with an organometallic compound so as to precipitate a solid magnesium/metal (aluminum) complex compound, and then bringing the resulting compound into contact with an electron donor and a titanium compound.

The amount of each component used in the preparation of the solid titanium catalyst component (a) differs from each preparation method, and can not be defined in general. However, for example, the electron donor is used in an amount 0.01 to 10 mol, preferably 0.1 to 5 mol, and the titanium compound is used in an amount of 0.01 to 1000 mol, preferably 0.1 to 200 mol, both based on 1 mol of the magnesium compound.

The solid titanium catalyst component (a) thus obtained contains titanium, magnesium, halogen and an electron donor as its essential ingredients.

In the solid titanium catalyst component (a), a ratio of halogen/titanium (atomic ratio) is about 2 to 200, preferably about 4 to 100, the a ratio of electron donor/titanium (molar ratio) is about 0.01 to 100, preferably about 0.02 to 10 and, a ratio of magnesium/titanium (atomic ratio) is 1 to 100, preferably 2 to 50.

The solid titanium catalyst component (a) (catalyst component [Ia]) is desirably used as a prepolymerized catalyst component [Ib] obtained by prepolymerization of olefin in the presence of said solid titanium catalyst component (a) and the following organometallic catalyst component (b).

The organometallic catalyst component (b) used in the preparation of the prepolymerized catalyst component [Ib] includes a organometallic compound of the metals belonging to the Group I to III of the periodic table, in concrete, such compounds as mentioned below;

organoaluminum compounds represented by the following formula (b-1)

$$R^1_m Al(OR^2)_n H_p X_q \qquad (b\text{-}1)$$

wherein $R^1$ and $R^2$ may be the same or different and represent independently a hydrocarbon group having normally 1 to 15 carbon atoms, preferably 1 to 4 carbon atoms; X is halogen; and m, n, p and q are numbers satisfying $0 < m \leq 3$, $0 \leq n < 3$, $0 \leq p < 3$, $0 \leq q < 3$ and $m+n+p+q=3$;

complex alkyl compounds of aluminum with Group I metals of the periodic table, represented by the following formula (b-2)

$$M^1 Al R^1_4 \qquad (b\text{-}2)$$

wherein $M^1$ is Li, Na or K and $R^1$ is as defined above; and dialkyl compounds of Group II or III metals represented by the following formula $$R^1 R^2 M^2 \qquad (b\text{-}3)$$

wherein $R^1$ and $R^2$ are as defined above, and $M^2$ is Mg, Zn or Cd.

Examples of the organoaluminum compounds having the formula (b-1) include:

compounds having the general formula of $R^1_m Al(OR^2)_{3-m}$ wherein $R^1$ and $R^2$ are as defined above, and m is a number preferably satisfying $1.5 \leq m \leq 3$;

compounds having the general formula of $R^1_m AlX_{3-m}$ wherein $R^1$ and X are as defined above, and m is a number preferably satisfying $0 < m < 3$;

compounds having the general formula of $R^1_m AlH_{3-m}$ wherein $R^1$ is as defined above, and m is a number preferably satisfying $2 \leq m \leq 3$; and compounds having the general formula of $R^1_m Al(OR^2)_n X_q$ wherein $R^1$, $R^2$ and X are as defined above, and m, n and q are numbers satisfying $0 < m \leq 3$, $0 \leq n < 3$, $0 \leq q < 3$ and $m+n+q=3$.

Concrete examples of the organoaluminum compounds having the formula (b-1) include trialkylaluminum compounds such as triethylaluminum and tributylaluminum;

trialkenylaluminum compounds such as triisoprenylaluminum;

dialkylaluminum alkoxides such as diethylaluminum ethoxide and dibutylaluminum butoxide;

alkylaluminum sesquialkoxides such as ethylaluminum sesquiethoxide and butylaluminum sesquibutoxide;

partially alkoxylated alkylaluminum compounds such as those having an average composition represented by, for example, the formula of $R^1_{2.5} Al(OR^2)_{0.5}$;

dialkylaluminum halides such as diethylaluminum chloride, dibutylaluminum chloride and diethylaluminum bromide;

alkylaluminum sesquihalides such as ethylaluminum sesquichloride, butylaluminum sesquichloride and ethylaluminum sesquibromide;

partially halogenated alkylaluminum compounds such as alkylaluminum dihalides such as ethylaluminum dichloride, propylaluminum dichloride and butylaluminum dibromide;

dialkylaluminum hydrides such as diethylaluminum hydride and dibutylaluminum hydride;

partially hydrogenated alkylaluminum compounds such as alkylaluminum dihydride, for example, ethylaluminum dihydride and propylaluminum dihydride; and partially alkoxylated and halogenated alkylaluminum compounds such as ethylaluminum ethoxychloride, butylaluminum butoxychloride and ethylaluminum ethoxybromide.

Furthermore, the compounds similar to the abovementioned compounds represented by formula (b-1) include organoaluminum compounds in which two or more aluminum atoms are bonded together via, for example, an oxygen atom or a nitrogen atom. Concrete examples of such compounds are as follows:

$$(C_2H_5)_2 AlOAl (C_2H_5)_2,$$

$$(C_4H_9)_2 AlOAl (C_4H_9)_2,$$

and

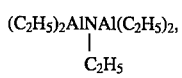

and methylaluminoxane.

Examples of the compounds having the formula (b-2) include

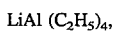

and

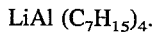

Among the above-exemplified compounds, preferred are organoaluminum compounds.

The olefin used in the preparation of the prepolymerization catalyst component [Ib] includes the compound represented by the above-mentioned formula (i) or (ii), concretely, olefins having a branched structure such as 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, allylnaphthalene, allylnorbornene, styrene, dimethylstyrene, vinylnaphthalene, allyltoluenes, allylbenzene, vinylcyclohexane, vinylcyclopentane, vinylcycloheptane and allyltrialkylsilanes. Of these, preferred are 3-methyl-1-butene, 3-methyl-1-pentene, 3-ethyl-1-hexene, vinylcyclohexane, allyltrimethylsilane and dimethylstyrene, more preferred are 3-methyl-1-butene, vinylcyclohexane and allyltrimethylsilane, and particularly preferred is 3-methyl-1-butene.

Furthermore, linear chain olefins such as ethylene, propylene, 1-butene, 1-octene, 1-hexadecene and 1-eicocene may be used in combination with the above-mentioned branched olefins.

The prepolymerization can be carried out in the presence of considerably higher-concentration of catalyst compared to the catalyst concentration in the system of propylene polymerization.

In the pre-polymerization, the solid titanium catalyst component (a) is desirably used in a concentration of normally about 0.01 to 200 mmol, preferably about 0.05 to 100 mmol, in terms of titanium atom, based on 1 liter of the later-described inert hydrocarbon solvent.

The organometallic catalyst component (b) is used in an amount so as to produce a polymer of 0.1 to 1000 g, preferably 0.3 to 500 g per 1 gram of the solid titanium catalyst component (a), and is used in a concentration of normally about 0.1 to 100 mmol, preferably about 0.5 to 50 mmol based on 1 mol of titanium atom in the solid titanium catalyst component (a).

In the prepolymerization, an electron donor (e) may be optionally used with the solid titanium catalyst component (a) and organometallic catalyst component (b). The electron donor (e) employable in the prepolymerization 10 include, concretely, the aforementioned electron donor used in the preparation of the solid titanium catalyst component (a), the later-described silicon compound (c) represented by the formula (iii), a compound (d) having at least two ether linkages existing via plurality of atoms, and an organosilicon compound represented by the following formula (c-i);

$$R_n Si(OR')_{4-n} \qquad (c\text{-}i)$$

wherein each of R and R' is a hydrocarbon group, and n is a number satisfying the condition of 0<n<4.

The later-described silicon compounds (c) represented by the formula (iii) are not included in the organosilicon compounds represented by this formula (c-i).

Concrete examples of the organosilicon compounds represented by the above formula (c-i) include:

trimethylmethoxysilane, trimethylethoxysilane, dimethyldimethoxysilane, dimethyldiethoxysilane, diisopropyldimethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bis-ethylphenyldimethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, n-butyltriethoxysilane, phenyltriethoxysilane, γ-aminopropyltriethoxysilane, chlorotriethoxysilane, ethyltriisopropoxysilane, vinyltributoxysilane, ethyl silicate, butyl silicate, trimethylphenoxysilane, methyltriallyoxysilane, vinyltris (β-methoxyethoxysilane), vinyltriacetoxysilane and dimethyltetraethoxydisiloxane.

The above-mentioned electron donors (e) may be used singly or in combination of two or more kinds.

In the case of using an electron donor in the prepolymerization, the amount of the electron donor (e) is in the range of 0.1 to 50 mol, preferably 0.5 to 30 mol, more preferably 1 to 10 mol, per 1 mol to titanium atom contained in the solid titanium catalyst component (a).

The prepolymerization is preferably carried out under a mild condition by adding the olefin represented by the above formula (i) or (ii) and the above mentioned catalyst components into an inert hydrocarbon solvent.

Concrete examples of the above-mentioned inert solvents include:

aliphatic hydrocarbons such as propane, butane, pentane, hexane, heptane, octane, decane, dodecane and kerosine;

alicyclic hydrocarbons such as cyclopentane, cyclohexane and methylcyclopentane;

aromatic hydrocarbons such as benzene, toluene and xylene;

halogenated hydrocarbons such as ethylene chloride and chlorobenzene; and mixtures of these hydrocarbons.

Of these inert hydrocarbon media, preferably used are aliphatic hydrocarbons.

The reaction temperature in the prepolymerization is a temperature at which the resulting prepolymer is not substantially dissolved in the inert hydrocarbon solvent, and is desired to be in the range of usually about −20° to 100° C., preferably about −20° to +80° C., more preferably 0° to +40° C. A molecular weight regulator such as hydrogen can be used in the prepolymerization.

The prepolymerization is desirably carried out so as to obtain about 0.1 to 1000 g, preferably about 0.3 to 500 g of polymer, per 1 g of the above mentioned solid titanium catalyst component (a). When the amount of the polymer produced in the prepolymerization is too much, the productive efficiency of the (co)polymer produced in the main polymerization is lowered, and the films formed from the resulting (co)polymer have a tendency to create a fish-eye.

The prepolymerization can be carried out by any process of a batch process and a continuous process.

The olefin polymerization catalyst used for the preparation of the propylene polymer according to the present invention is formed from the above mentioned solid titanium catalyst component [Ia] or the prepolymerized catalyst component [Ib], an organometallic catalyst component [II], and [III] a silicon compound (c) or a compound (d) having at least two ether linkages existing via plurality of atoms.

As the organometallic catalyst component [II], the aforementioned organometallic catalyst component (b) used in the preparation of the prepolymerized catalyst component [Ib] can be employed.

The silicon compound (c) [III] is the compound represented by the following formula (iii);

wherein, n is 1, 2 or 3; when n is 1, $R^a$ is a secondary or a tertiary hydrocarbon group; when n is 2 or 3, at least one of $R^a$ is a secondary or a tertiary hydrocarbon group, $R^a$ may be the same or different, and $R^b$ is a hydrocarbon group of 1 to 4 carbon atoms; and when 4-n is 2 or 3, $R^b$ may be the same or different.

In the silicon compound (c) represented by the formula (iii), the secondary or the tertiary hydrocarbon group includes cyclopentyl, cyclopentenyl and cyclopentadienyl, and substituted thereof, and the hydrocarbon group in which the carbon adjacent to Si is a secondary or tertiary.

More concretely, the substituted cyclopentyl group includes cyclopentyl group having alkyl group such as 2-methylcyclopentyl, 3-methylcyclopentyl, 2-ethylcyclopentyl, 2-n-butylcyclopentyl, 2,3-dimethylcyclopentyl, 2,4-dimethylcyclopentyl, 2,5-dimethylcyclopentyl, 2,3-diethylcyclopentyl, 2,3,4-trimethylcyclopentyl, 2,3,5-trimethylcyclopentyl, 2,3,4-triethylcyclopentyl, tetramethylcyclopentyl and tetraethylcyclopentyl;

the substituted cyclopentenyl group includes cyclopentenyl group having alkyl group such as 2-methylcyclopentenyl, 3-methylcyclopentenyl, 2-ethylcyclopentenyl, 2-n-butylcyclopentenyl, 2,3-dimethylcyclopentenyl, 2,4-dimethylcyclopentenyl, 2,5d-imethylcyclopentenyl, 2,3,4-trimethylcyclopentenyl, 2,3,5-trimethylcyclopentenyl, 2,3, 4-triethylcyclopentenyl, tetramethylcyclopentenyl and tetraethylcyclopentenyl;

the substituted cyclopentadienyl group includes cyclopentadienyl group having alkyl group such as 2-methylcyclopentadienyl, 3-methylcyclopentadienyl, 2-ethylcyclopentadienyl, 2-n-butylcyclopentadienyl, 2,3-dimethylcyclopentadienyl, 2,4-dimethylcyclopentadienyl, 2,5-dimethylcyclopentadienyl, 2,3-diethylcyclopentadienyl, 2,3,4-trimethylcyclopentadienyl, 2,3, 5-trimethylcyclopentadienyl, 2,3,4-triethylcyclopentadienyl, 2,3,4,5-tetramethylcyclopentadienyl, 2,3, 4,5-tetraethylcyclopentadienyl, 1,2,3,4,5-pentamethylcyclopentadienyl and 1,2,3,4,5-pentaethylcyclopentadienyl.

The hydrocarbon group in which the carbon adjacent to Si is a secondary includes i-propyl, s-butyl, s-amyl and α-benzyl; and the hydrocarbon group in which the carbon adjacent to Si is a tertiary includes t-butyl, t-amyl, α,α'-diemethylbenzyl and admantyl.

When n is 1, the silicon compound (c) represented by the formula (iii) includes trialkoxysilanes such as cyclopentyltrimethoxysilane,
2-methylcyclopentyltrimethoxysilane,
2,3-dimethylcyclopentyltrimethoxysilane,
cyclopentyltriethoxysilane,
iso-butyltriethoxysilane,
t-butyltriethoxysilane,
cyclohexyltrimethoxysilane,
cyclohexyltriethoxysilane,
2-norbornanetrimethoxysilane, and
2-norbornanetriethoxysilane;

when n is 2, the silicon compound (c) represented by the formula (iii) includes dialkoxysilanes such as dicyclopentyldiethoxysilane,
t-butylmethyldimethoxysilane,
t-butylmethyldiethoxysilane,
t-amylmethyldiethoxysilane,
dicyclohexyldimethoxysilane,
cyclohexylmethyldimethoxysilane,
cyclohexylmethyldiethoxysilane, and
2-norbornanemethyldimethoxysilane.

When n is 2, the silicon compound (c) represented by the formula (iii) is preferably dimethoxy compound represented by the following formula (iv);

wherein, $R^a$ and $R^c$ are each independently a cyclopentyl group, a substituted cyclopentyl group, a cyclopentenyl group, a substituted cyclopentenyl group, cyclopentadienyl group, a substituted cyclopentadienyl group or a hydrocarbon group whose carbon adjacent to Si is a secondary carbon or a tertiary carbon.

The silicon compound represented by the formula (iv) includes, for example, dicyclopentyldimethoxysilane, dicyclopentenyldimethoxyxilane,
dicyclopentadienyldimethoxyxilane,
di-t-butyldimethoxysilane,
di-(2-methylcyclopentyl) dimethoxysilane,
di-(3-methylcyclopentyl) dimethoxysilane,
di-(2-ethylcyclopentyl) dimethoxysilane,
di-(2,3-dimethylcyclopentyl) dimethoxysilane,
di-(2,4-dimethylcyclopentyl) dimethoxysilane,
di-(2,5-dimethylcyclopentyl) dimethoxysilane,
di-(2,3-diethylcyclopentyl) dimethoxysilane,
di-(2,3,4-trimethylcyclopentyl) dimethoxysilane,
di-(2,3,5-trimethylcyclopentyl) dimethoxysilane,
di-(2,3,4-triethylcyclopentyl) dimethoxysilane,
di-(tetramethylcyclopentyl) dimethoxysilane,
di-(tetraethylcyclopentyl) dimethoxysilane,
di-(2-methylcyclopentenyl) dimethoxysilane,
di-(3-methylcyclopentenyl) dimethoxysilane,
di-(2-ethylcyclopentenyl) dimethoxysilane,
di-(2-n-butylcyclopentenyl) dimethoxysilane,
di-(2,3-dimethylcyclopentenyl) dimethoxysilane,
di-(2,4-dimethylcyclopentenyl) dimethoxysilane,
di-(2,5-dimethylcyclopentenyl) dimethoxysilane,
di-(2,3,4-trimethylcyclopentenyl) dimethoxysilane,
di-(2,3,5-trimethylcyclopentenyl) dimethoxysilane,
di-(2,3,4-triethylcyclopentenyl) dimethoxysilane,
di-(tetramethylcyclopentenyl) dimethoxysilane,
di-(tetraethylcyclopentenyl) dimethoxysilane,
di-(2-methylcyclopentadienyl) dimethoxysilane,
di-(3-methylcyclopentadienyl) dimethoxysilane,
di-(2-ethylcyclopentadienyl) dimethoxysilane,
di-(2-n-butylcyclopentadienyl) dimethoxysilane,
di-(2,3-dimethylcyclopentadienyl) dimethoxysilane,
di-(2,4-dimethylcyclopentadienyl) dimethoxysilane,
di-(2,5-dimethylcyclopentadienyl) dimethoxysilane,
di-(2,3-diethylcyclopentadienyl) dimethoxysilane,
di-(2,3,4-trimethylcyclopentadienyl) dimethoxysilane,
di-(2,3,5-trimethylcyclopentadienyl) dimethoxysilane,
di-(2,3,4-triethylcyclopentadienyl)dimethoxysilane,
di-(2,3,4,5-tetramethylcyclopentadienyl ) dimethoxysilane,
di-(2,3,4,5-tetraethylcyclopentadienyl) dimethoxysilane, di-(1,2,3,4,5-pentamethylcyclopentadienyl) dimethoxysilane,
di-(1,2,3,4,5-pentaethylcyclopentadienyl) dimethoxysilane,
di-t-amyl-dimethoxysilane,
di-(α,α'-dimethylbenzyl) dimethoxysilane,
di-(admantyl) dimethoxysilane,
admantyl-t-butyldimethoxysilane,
cyclopentyl-t-butyldimethoxysilane,
di-isopropyldimethoxysilane,
di-s-butyldimethoxysilane,
di-s-amyldimethoxysilane, and
isopropyl-s-butyldimethoxysilane.

When n is 3, the silicon compound represented by the formula (iii) includes monoalkoxysilanes such as tricyclopentylmethoxysilane, tricyclopentylethoxysilane, dicyclopentylmethylmethoxysilane,
dicyclopentylethylmethoxysilane,
dicyclopentylmethylethoxysilane,
dicyclopentyldimethylmethoxysilane,
cyclopentyldiethylmethoxysilane, and
cyclopentyldimethylethoxysilane.

Of these, preferred are dimethoxysilanes, particularly preferred are dimethoxysilanes represented by the formula (iv), to be concretely, preferably used is dicyclopentyldimethoxysilane, di-t-butyldimethoxysilane, di- (2 -methylcyclopentyl) dimethoxysilane, di- (3-methylcyclopentyl) dimethoxysilane or di-t-amyldimethoxysilane.

The silicon compound (c) may be used either singly or in combination.

In the compound (d) having at least two ether linkages existing via plurality of atoms (hereinafter sometimes referred as "polyether compound") used in the present invention, the atoms existing between these ether linkages are at least one kind of atom selected from the group consisting of carbon, silicon, oxygen, sulfur, phosphorus and boron, and the number of the atoms are not less than two. Of these compounds mentioned above, preferred are those in which a relatively bulky substituent attaches to the atom intermediately existing between the ether linkages. The relatively bulky substituent concretely means the substituent having 2 or more of carbon atoms, preferably the substituent having a structure of linear, branched or cyclic containing 3 or more of carbon atoms, particularly the substituent having branched or cyclic structure. Further, preferred is a compound containing a plurality of, preferably 3 to 20, more preferably 3 to 10, particularly preferably 3 to 7 carbon atoms in the atoms intermediately existing between at least two ether linkages. Such polyether compound as mentioned above includes, for example, those represented by the following formula

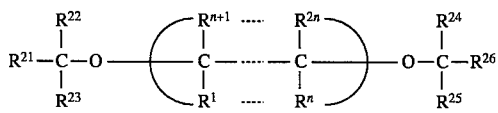

wherein n is an integer of $2 \leq n \leq 10$, $R^1$–$R^{26}$ are each a substituent having at least one element selected from among carbon, hydrogen, oxygen, halogen, nitrogen, sulfur, phosphorus, boron and silicon, any of $R^1$–$R^{26}$, preferably $R1$-$R^{2n}$ may form, together a ring other than a benzene ring, and the main chain of the compound may contain atoms other than carbon. The polyether compound as illustrated above includes 2-(2-ethylhexyl) -1,3-dimethoxypropane, 2-isopropyl-1,3-dimethoxypropane, 2-butyl-1,3-dimethoxypropane, 2-s-butyl- 1,3-dimethoxypropane, 2-cyclohexyl-1,3-dimethoxypropane, 2-phenyl- 1,3-dimethoxypropane, 2-cumyl-1,3-dimethoxypropane, 2-(2-phenylethyl) -1,3-dimethoxypropane, 2- (2-cyclohexylethyl)- 1,3-dimethoxypropane, 2- (p-chlorophenyl)- 1,3-dimethoxypropane, 2-(diphenylmethyl) -1,3-dimethoxypropane, 2 - (1-naphthyl )-1,3-dimethoxypropane, 2-( 2-fluorophenyl)-1,3-dimethoxypropane, 2- (1-decahydronaphthyl)- 1,3-dimethoxypropane, 2-(p-t-butylphenyl)- 1,3-dimethoxypropane, 2,2-dicyclohexyl-1,3-dimethoxypropane, 2,2-dicyclopentyl-1,3-dimethoxypropane, 2,2-diethyl-1,3-dimethoxypropane, 2,2-dipropyl-1,3-dimethoxypropane, 2,2-diisopropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, -methyl-2-ethyl-1,3-dimethoxypropane, 2-methyl-2-iso-propyl- 1,3-dimethoxypropane, 2-methyl-2-phenyl-1,3-dimethoxypropane, 2-methyl-2-cyclohexyl-1,3-dimethoxypropane, 2,2-bis (p-chlorophenyl) -1,3-dimethoxypropane, 2,2-bis (2-cyclohexylethyl) -1,3-dimethoxypropane, 2-methyl-2-iso-butyl-1,3-dimethoxypropane, 2-methyl-2- (2-ethylhexyl) -1,3-dimethoxypropane, 2,2-di-iso-butyl-1,3-dimethoxypropane, 2,2-diphenyl-1,3-dimethoxypropane, 2,2-dibenzyl-1,3-dimethoxypropane, 2,2-bis (cyclohexylmethyl) -1,3-dimethoxypropane, 2,2-di-iso-butyl-1,3-diethoxypropane, 2,2-di-iso-butyl-1,3-dibutoxypropane, 2-iso-butyl-2-isopropyl- 1,3-dimethoxypropane, 2- (1-methylbutyl) -2-isopropyl- 1,3-dimethoxypropane, 2- (1-methylbutyl) -2-s-butyl-1,3-dimethoxypropane, 2,2-di-s-butyl-1,3-dimethoxypropane, 2,2-di-t-butyl- 1,3-dimethoxypropane, 2,2-dineopentyl-1,3-dimethoxypropane, 2-iso-propyl-2-isopentyl-1,3-dimethoxypropane, 2-phenyl-2-isopropyl-1,3-dimethoxypropane, 2-phenyl-2-s-butyl-1,3-dimethoxypropane, 2-benzyl-2-isopropyl-1,3-dimethoxypropane, 2-benzyl-2-s-butyl- 1,3-dimethoxypropane, 2-phenyl-2-benzyl-1,3-dimethoxypropane, 2-cyclopentyl-2-isopropyl- 1,3-dimethoxypropane, 2-cyclopentyl-2-s-butyl-1,3-dimethoxypropane, 2-cyclohexyl-2-isopropyl-1,3-dimethoxypropane, 2-cyclohexyl-2-s-butyl-1,3-dimethoxypropane, 2-isopropyl-2-s-butyl-1,3-dimethoxypropane, 2-cyclohexyl-2-cyclohexylmethyl-1,3-dimethoxypropane, 2,3-diphenyl-1,4-diethoxybutane, 2,3-dicyclohexyl- 1,4-diethoxybutane, 2,2-dibenzyl-1,4-diethoxybutane, 2,3-dicyclohexyl-1,4-diethoxybutane, 2,3-di-iso-propyl- 1,4-diethoxybutane, 2,2-bis (p-methylphenyl)- 1,4-dimethoxybutane, 2,3-bis (p-chlorophenyl) -1,4-dimethoxybutane, 2,3-bis (p-fluorophenyl) -1,4-dimethoxybutane, 2,4-diphenyl-1,5-dimethoxypentane, 2,5-diphenyl- 1,5-dimethoxyhexane, 2,4-di-iso-propyl-1,5-dimethoxypentane, 2,4-di-iso-butyl-1, 5-dimethoxypentane, 2,4-di-iso-amyl-1,5-dimethoxypentane, 3-methoxymethyltetrahydrofuran, 3-methoxymethyldioxane, 1,3-di-iso-butoxypropane, 1,2-di-isobutoxypropane, 1,2-di-isobutoxyethane, 1,3-di-isoamyloxypropane, 1,3-di-isoneopentyloxyethane, 1,3-dineopentyloxypropane, 2,2-tetramethylene- 1,3-dimethoxypropane, 2,2-pentamethylene- 1,3-dimethoxypropane, 2,2-hexamethylene-1,3-dimethoxypropane, 1,2-bis (methoxymethyl) cyclohexane, 2,8-dioxaspiro[5,5]undecane, 3,7-dioxabicyclo[3,3,1] nonane, 3,7-dioxabicyclo[3,3,0]octane, 3,3-di-iso-butyl-1,5-oxononane, 6,6-di-iso-butyldioxyheptane, 1,1-dimethoxymethylcyclopentane, 1,1-bis (dimethoxymethyl) cyclohexane, 1,1-bis (methoxymethyl) bicyclo [ 2,2,1 ] heptane, 1,1 -dimethoxymethylcyclopentane, 2-methyl-2-methoxymethyl-1,3-dimethoxypropane, 2-cyclohexyl-2-ethoxymethyl-1,3-diethoxypropane, 2-cyclohexyl-2-methoxymethyl-1,3-dimethoxypropane, 2,2-di-iso-butyl-1,3-dimethoxycyclohexane, 2-iso-propyl-2-iso-amyl-1,3-dimethoxycyclohexane, 2-cyclohexyl-2-methoxymethyl-1, 3-dimethoxycyclohexane, 2-iso-propyl-2-methoxymethyl- 1,3-dimethoxycyclohexane, 2-iso-butyl-2-methoxymethyl-1,3-dimethoxycyclohexane, 2-cyclohexyl-2 -ethoxymethy-1,3-diethoxycyclohexane, 2-cyclohexyl-2-ethoxymethyl-1,3-dimethoxycyclohexane, 2-iso-propyl-2 -ethoxymethyl-1,3-diethoxycyclohexane, 2-iso-propyl-2-ethoxymethyl-1,3-dimethoxycyclohexane, 2,-iso-butyl-2-ethoxymethyl-1,3-diethoxycyclohexane, 2-iso-butyl-2-ethoxymethyl-1,3-dimethoxycyclohexane, tris (p-methoxyphenyl) phosphine, methlphenylbis (methoxymethyl) silane, diphenylbis (methoxymethyl) silane, methylcyclohexylbis (methoxymethyl) silane, di-t-butylbis (methoxymethyl) silane, cyclohexyl-t-butylbis (methoxymethyl) silane and iso-propyl-t-butylbis (methoxymethyl) silane.

Of these compounds, preferred are 1,3-diethers, especially, 2,2-di-iso-butyl-1,3-dimethoxypropane, 2-iso-propyl-2-iso-pentyl-1,3-dimethoxypropane, 2,2-dicyclohexyl- 1,3-dimethoxypropane and 2,2-bis (cyclohexylmethyl) -1,3-dimethoxypropane. These polyether compounds may be used either singly or in combination.

Next, processes for preparing the propylene polymer of the invention are described.

The propylene polymer of the invention can be obtained by polymerizing propylene in the presence of the olefin polymerization catalyst formed from the solid titanium catalyst component [Ia], the organometallic catalyst component [II] and the silicon compound (c) represented by the formula (iii) or the polyether compound (d) [III], preferably in the presence of the olefin polymerization catalyst formed from the prepolymerized catalyst component [Ib], the organometallic catalyst component [II] and the silicon compound (c) represented by the formula (iii) or the polyether compound (d) [III].

In the polymerization of propylene, a small amount of other olefin than propylene or a small amount of a diene compound may be present in the polymerization system in addition to propylene.

Examples of the olefin other than propylene include ethylene and olefins of 3 to 8 carbon atoms such as 1-butene, 1-pentene, 1-hexene, 4-methyl-1-pentene, 3-methyl- 1-pentene, 1-octene and 3-methyl-1-butene.

Examples of the diene compound include diene compounds of 4 to 20 carbon atoms such as 1,3-butadiene, 1,3-pentadiene, 1,4-pentadiene, 1,3-hexadiene, 1,4-hexadiene, 1,5-hexadiene, 4-methyl-1,4-hexadiene, 5-methyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene, 1,7-octadiene, 1, 9-decadiene, isoprene, butadiene, ethylidenenorbornene, vinylnorbornene and dicyclopentadiene.

The polymerization of propylene is generally conducted in a gas phase or a liquid phase.

When the polymerization is a slurry polymerization or a solution polymerization, the same inert hydrocarbon as used for preparing the aforesaid prepolymerized catalyst component [Ib] can be employed as a reaction solvent.

In the polymerization system, the solid titanium catalyst component [Ia] or the prepolymerized catalyst component [Ib] is used in an amount of usually about 0.0001 to 50 mmol, preferably about 0.001 to 10 mmol, in terms of titanium atom contained in the solid titanium catalyst component [Ia] or contained in the prepolymerized catalyst component [Ib], per 1 liter of the polymerization volume. The organometallic catalyst component [II] is used in such an amount that the amount of the metal atom contained in the organometallic catalyst component [II] might be in the range of usually about 1 to 2,000 mol, preferably about 2 to 500 mol, per 1 mol of the titanium atom in the polymerization system. The silicon compound (c) or the polyether compound (d) [III] is used in an amount of usually about 0.001 to 50 mol, preferably about 0.01 to 20 mol, per 1 mol of the metal atom in the organometallic catalyst component [II].

If hydrogen is used in the polymerization stage, a propylene polymer having a high melt flow rate can be obtained. Further, the molecular weight of the propylene polymer can be controlled by adjusting the amount of hydrogen. Even in the case of using hydrogen, the obtained propylene polymer of the invention is never lowered in the crystallinity and the pentad isotacticity, and moreover the catalytic activity is not reduced.

In the invention, the polymerization of propylene is carried out at a temperature of usually about −50° to 200° C., preferably about 20° to 100° C., under a pressure of usually an ordinary pressure to 100 kg/cm$^2$, preferably about 2 to 50 kg/cm$^2$. The polymerization may be carried out either batchwise, semi-continuously or continuously.

When a propylene polymer is prepared as above, a yield of the propylene polymer per unit amount of the solid catalyst component can be increased, and hence the amount of the catalyst residue (particularly halogen content) in the propylene polymer can be relatively reduced. Accordingly, an operation for removing the catalyst residue contained in the propylene polymer can be omitted, and moreover in the case of molding the obtained propylene polymer, a mold can be easily prevented from occurrence of rust.

In the propylene polymer obtained as above, an amount of an amorphous component is extremely small, and thereby an amount of the hydrocarbon-soluble component is also small. Accordingly, a film formed from the propylene polymer has low surface tackiness.

The propylene polymer used in the invention may be prepared in two or more polymerization stages having different reaction conditions. In this case, the polymerization is carried out in a gas phase or a liquid phase using 2 to 10 polymerizers.

When the polymerization is a slurry polymerization or a solution polymerization, the same inert hydrocarbon as used for preparing the aforesaid prepolymerized catalyst component [Ib] can be employed as a reaction solvent.

In this polymerization process, polymerization of propylene is conducted in at least one polymerizer among the two or more polymerizers, to prepare a polymer having an intrinsic viscosity [η] of 3 to 40 dl/g, preferably 5 to 30 dl/g, particularly preferably 7 to 25 dl/g. This polymerization is sometimes referred to as "A polymerization" hereinafter.

It is desired that the isotactic pentad value (pentad isotacticity) [$M_5$] determined by the NMR measurement of the boiled heptane-insoluble component in the polymer obtained in this A polymerization is in the range of 0,960 to 0.995, preferably 0.970 to 0.995, more preferably 0.980 to 0.995, most preferably 0,982 to 0,995.

It is also desired that the amount of the boiled heptane-insoluble component in the polymer is not less than 80%, preferably not less than 90%, more preferably not less than 94%, much more preferably not less than 95%, particularly preferably not less than 96%.

In the A polymerization, the polymer is preferably prepared in such a manner that the amount of the polymer obtained in the A polymerization might be in the range of 0.1 to 55%, more preferably 2 to 35%, particularly preferably 5 to 30%, based on the amount of the polymer finally obtained.

In the case of preparing the propylene polymer using two or more polymerizers, polymerization of propylene is also conducted in the residual polymerizers out of the two or more polymerizers to prepare a propylene polymer having a melt flow rate of 0.1 to 500 g/10 min as a final polymer. This polymerization is sometimes referred to as "B polymerization" hereinafter.

In the A polymerization and the B polymerization, the solid titanium catalyst component [Ia] or the prepolymerized catalyst component [Ib] is used in an amount of usually about 0.0001 to 50 mmol, preferably about 0.001 to 10 mmol, in terms of titanium atom contained in the solid titanium catalyst component [Ia] or contained in the prepolymerized catalyst component [Ib], per 1 liter of the polymerization volume. The organometallic catalyst component [II] is used in such an amount that the amount of the metal atom contained in the organometallic catalyst component [II] might be in the range of usually about 1 to 2,000 mol, preferably about 2 to 500 mol, per 1 mol titanium atom in the polymerization system. The silicon compound (c) or the polyether compound (d) [III] is used in an amount of usually about 0.001 to 50 mol, preferably about 0.01 to 20 mol, per 1 tool of the metal atom in the organometallic catalyst component [II].

If necessary, the solid titanium catalyst component [Ia] or the prepolymerized catalyst component [Ib], the organometallic catalyst component [II] and the silicon compound (c) or the polyether compound (d) [III] may be added to any of the plural polymerizers. Further, the electron donor used in the preparation of the solid titanium catalyst component (a) and/or the organosilicon compound represented by the above formula (c-i) may be added to any of the plural polymerizers.

Further, in any of the A polymerization and the B polymerization, hydrogen may be fed or removed, whereby the molecular weight of the propylene polymer can be easily regulated. Even in this case, the obtained propylene polymer of the invention is never lowered in the crystallinity and the pentad isotacticity, and moreover the catalytic activity is not reduced. The feed amount of hydrogen varies according to the reaction conditions, but generally, the feed amount of hydrogen is such an amount that the melt flow rate of the polymer finally obtained might be in the range of 0.1 to 500 g/10 min.

The value [M$_5$] of the boiled heptane-insoluble component is usually in the range of 0.975 to 0.995, preferably 0.980 to 0.995, more preferably 0.982 to 0.995; and the value [M$_3$] of the boiled heptane-insoluble component is usually in the range of 0.0020 to 0.0050, preferably 0.0023 to 0.0045, more preferably 0.0025 to 0.0040.

In the A polymerization and the B polymerization, the polymerization of propylene is carried out at a temperature of usually about −50° to 200° C., preferably about 20° to 100° C., under a pressure of usually an ordinary pressure to 100 kg/cm², preferably about 2 to 50 kg/cm². The polymerization may be carried out either batchwise, semi-continuously or continuously.

The propylene polymer according to the invention may contain such a nucleating agent as described later. By adding the nucleating agent to the propylene polymer, the crystal particles can be made more fine and the crystallization speed can be heightened, whereby high-speed molding is attained.

There is no specific limitation on the nucleating agent employable herein, and various nucleating agents conventionally known can be used. Of various nucleating agents, preferred are those represented by the following formulas.

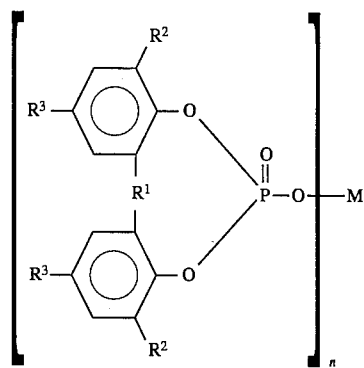

wherein R$^1$ is oxygen, sulfur or a hydrocarbon group of 1 to 10 carbon atoms; each of R$^2$ and R$^3$ is hydrogen or a hydrocarbon group of 1 to 10 carbon atoms; R$^2$ and R$^3$ may be the same as or different from each other; two of R$^2$, two of R$^3$, or R$^2$ and R$^3$ may be bonded together to form a ring, M is a monovalent to trivalent metal atom; and n is an integer of 1 to 3.

Concrete examples of the nucleating agents represented by the above formula include sodium-2,2'-methylene-bis(4,6-di-t-butylphenyl)-phosphate, sodium-2,2'-ethylidene-bis (4,6-di-t-butylphenyl)phosphate, lithium-2,2' -methylene-bis(4,6-di-t-butylphenyl)phosphate, lithium-2,2'-ethylidene-bis (4,6-di-t-butylphenyl)phosphate, sodium-2,2'-ethylidene-bis (4-1-propyl-6-t-butylphenyl)phosphate, lithium-2,2'-methylene-bis (4-methyl-6-t-butylphenyl) phosphate, lithium- 2,2'-methylene-bis (4-ethyl-6-t-butylphenyl ) phosphate, calcium-bis [2,2'-thiobis (4-methyl-6-t-butylphenyl)phosphate], calcium-bis [2,2'-thiobis (4-ethyl-6-t-butylphenyl) phosphate], calcium-bis [2,2'-thiobis- (4, 6-di-t-butylphenyl)phosphate], magnesium-bis [2,2'-thiobis- (4,6-di-t-butylphenyl) phosphate], magnesium-bis [2,2'-thiobis-(4-t-octylphenyl)phosphate], sodium-2,2' -butylidene-bis (4,6dimethylphenyl) phosphate, sodium-2,2'-butylidene-bis (4, 6-di-t-butylphenyl phosphate, sodium-2,2'-t-octylmethylene-bis (4,6-dimethylphenyl)phosphate, sodium-2,2'-t-octylmethylene-bis (4,6-di-t-butylphenyl) phosphate, calcium-bis [2,2' -methylene-bis (4,6-di-t-butylphenyl) phosphate], magnesium-bis [2,2'-methylene-bis (4,6-di-t-butylphenyl) phosphate], barium-bis [2,2'-methylene-bis (4,6-di-t-butylphenyl) phosphate] , sodium-2,2'-methylene-bis (4-methyl- 6-t-butylphenyl) phosphate, sodium-2,2'-methylenebis (4-ethyl-6-t-butylphenyl)phosphate, sodium(4,4'-dimethyl-5,6'-di-t-butyl-2,2' -biphenyl) phosphate, calcium-bis [(4,4'-dimethyl-6, 6'-di-t-butyl-2,2'-biphenyl) phosphate], sodium-2,2' -ethylidene-bis (4-m-butyl- 6-t-butylphenyl)phosphate, sodium-2,2'-methylene-bis (4, 6dimethylphenyl) phosphate, sodium-2,2' -methylene-bis (4, 6diethylphenyl) phosphate, potassium-2,2'-ethylidene-bis (4,6-di-t-butylphenyl) phosphate, calcium-bis [2,2'-ethylidene-bis (4,6-di-t-butylphenyl)phosphate], magnesium-bis [2,2'-ethylidene-bis (4,6-di-t-butylphenyl) phosphate], barium-bis [2,2' -ethylidene-bis ( 4, 6-di-t -butylphenyl )phosphate], aluminum-tris [2,2'-methylene-bis (4, 6-di-t-butylphenyl)phosphate] and aluminum-tris [2,2'-ethylidene-bis (4,6-di-t-butylphenyl)phosphate]. Mixtures of two or more of these nucleating agents are also employable. Of these, sodium-2,2'-methylene-bis (4,6-di-t-butylphenyl)phosphate is particularly preferred.

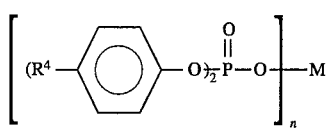

wherein $R^4$ is hydrogen or a hydrocarbon group of 1 to 10 carbon atoms; M is a monovalent to trivalent metal atom; and n is an integer of 1 to 3.

Concrete examples of the nucleating agents represented by the above formula include sodium-bis (4-t-butylphenyl) phosphate, sodium-bis (4-methylphenyl) phosphate, sodium-bis (4-ethylphenyl)phosphate, sodium-bis (4-i-propylphenyl) phosphate, sodium-bis (4-t-octylphenyl) phosphate, potassium-bis (4-t-butylphenyl)phosphate, calcium-bis (4-t-butylpheyl) phosphate, magnesium-bis (4-t-butylpheyl) phosphate, lithium-bis (4-t-butylpheyl)phosphate and aluminum-bis (4-t-butylpheyl)phosphate. Mixtures of two or more of these nucleating agents are also employable. Of these, sodium-bis (4-t-butylphenyl) phosphate is particularly preferred.

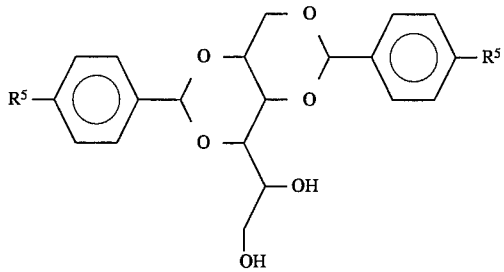

wherein $R^5$ is hydrogen or a hydrocarbon group of 1 to 10 carbon atoms.

Concrete examples of the nucleating agents represented by the above formula include 1,3,2,4-dibenzylidenesorbitol,
1,3-benzylidene-2,4 -p-methylbenzylidenesorbitol,
1,3-benzylidene-2,4 -p-ethylbenzylidenesorbitol,
1,3-p-methylbenzylidene-2,4-benzylidenesorbitol,
1,3-p-ethylbenzylidene-2,4-benzylidenesorbitol,
1,3-p-methylbenzylidene-2,4-p-ethylbenzylidenesorbitol,
1,3-p-ethylbenzylidene-2, 4 -p-methylbenzylidenesorbitol,
1,3,2,4-di (p-methylbenzylidene) sorbitol,
1,3,2,4-di (p-ethylbenzylidene) sorbitol,
1,3,2,4-di (p-n-propylbenzylidene) sorbitol,
1,3,2,4-di (p-i-propylbenzylidene) sorbitol,
1,3,2,4-di (p-n-butylbenzylidene) sorbitol,
1,3,2, 4-di (p-s-butylbenzylidene) sorbitol,
1,3,2,4-di (p-t-butylbenzylidene) sorbitol,
1, 3,2,4-di (2', 4'-dimethylbenzylidene) sorbitol,
1,3,2,4-di (p-methoxybenzylidene) sorbitol,
1,3,2,4-di (p-ethoxybenzylidene) sorbitol,
1,3-benzylidene-2,4-p-chlorobenzylidenesorbitol,
20 1,3-p-chlorobenzylidene-2,4-benzylidenesorbitol,
1,3-p-chlorobenzylidene-2,4-p-methylbenzylidenesorbitol,
1,3-p-chlorobenzylidene-2,4-p-ethylbenzylidenesorbitol,
1,3-p-methylbenzylidene-2,4-p-chlorobenzylidenesorbitol,
1,3-p-ethylbenzylidene-2,4-p-chlorobenzylidenesorbitol and
1,3,2,4-di (p-chlorobenzylidene) sorbitol. Mixtures of two or more of these nucleating agents are also employable. Of these, 1,3,2,4-dibenzylidenesorbitol, 1,3,2, 4-di (p-methylbenzylidene) sorbitol, 1,3,2,4-di (p-ethylbenzylidene) sorbitol, 1,3-p-chlorobenzylidene-2,4-p-methylbenzylidenesorbitol, 1,3,2,4-di (p-chlorobenzylidene) sorbitol and mixtures of two or more of these nucleating agents are particularly preferred.

Also employable are other nucleating agents such as metallic salts of aromatic carboxylic acids and metallic salts of aliphatic carboxylic acids. Concrete examples thereof include aluminum benzoate, aluminum p-t-butylbenzoate, sodium adipate, sodium thiophenecarboxylate and sodium pyrrolecarboxylate.

Inorganic compounds such as talc described later may be also used.

In the propylene polymer used in the invention, the nucleating agent is used in an amount of 0.001 to 10 parts by weight, preferably 0.01 to 5 parts by weight, more preferably 0.1 to 3 parts by weight, based on 100 parts by weight of the propylene polymer.

By the use of the nucleating agent in the abovementioned amount, there can be obtained a propylene polymer having extremely fine crystalline particles and enhanced in crystallinity without deterioration of excellent properties inherently belonging to the propylene polymer.

Terpene resin having no polar group and a petroleum resin having no polar group

The terpene resins having no polar group to be used in the present invention include a terpene resin which does not have any polar groups, such as hydroxy, formyl, carbonyl, carboxyl, sulfon (-$SO_3Y$ where Y is H, Na and Mg) and halogen, or the modified resins thereof. That is, the resins are hydrocarbons having a composition of $(C_5H_8)_n$ and the modified compounds thereof. The terpene resin is sometimes called as "terpenoid".

The terpene resins include, for example, pinene, carene, myrcene, ocimene, lymonene, terpinolene, terpinene, sabinene, tricyclene, bisabolene, zingiberene, santalene, camphorene, mirene, totarene and the like.

The petroleum resin having no polar group to be used in the present invention is a petroleum resin which does not have any polar groups, such as hydroxy, carboxyl, sulfon (-$SO_3Y$ where Y is H, Na and Mg) and halogen, or the modified resins thereof. That is, the resins are cyclopentadiene type resins directly obtained from a petroleum type unsaturated hydrocarbon or resins obtained from a higher olefin hydrocarbon as a main ingredient.

The petroleum resin having no polar group has a glass transition temperature (Tg) of 50° C. or higher, preferably 60° C. or higher, more preferably 60° C. to 100° C., a softening point, measured in accordance with ASTM E-28, of 100° C. or higher, preferably 110° C. or higher, more preferably 110° C. to 150° C., a specific gravity, measured in accordance with ASTM D-156, of 0.900 to 1.30, preferably 0.980 to 1.20, and a weight average molecular weight (Mw), measured by a gel permeation chromatography (GPC), of 400 or more, preferably 500 or more, more preferably 500 to 2000.

In the present invention, it is preferred to use a hydrogenated petroleum resin having a hydrogenation ratio of 80% or more, preferably 95% or more as the petroleum resin having no polar group, which is obtained by the addition of hydrogen to the above petroleum resin. The hydrogenated petroleum resins include a hydrogenated alicyclic petroleum resin, for example, "ESCOREZ" (trade name, produced by TONEX Co., Ltd. ).

Hydrogenated petroleum resin (D)

As the hydrogenated petroleum resin (D) to be used in the present invention, conventional hydrogenated petroleum resins may be widely used, for example, a hydrogenated material of a resin obtained by polymerizing an aromatic hydrocarbon and a hydrogenated terpene resin are mentioned. The hydrogenated petroleum resins (D) include, for example, a hydrogenated material of a resin obtained by polymerizing one monomer selected from various aromatic unsaturated hyrocarbons, such as syrene, α-methylstyrene, vinyltoluene, vinylxylene, propenylbenzene, indene, methylindene and ethylindene, and terpenes; and a hydrogenated material of a resin obtained by polymerizing at least two monomers selected from the above-mentioned aromatic unsaturated hydrocarbons and terpenes. Further, there may be mentioned a hydrogenated material of a resin obtained by polymerizing a fraction (boiling point is 20° to 300° C., preferably 150 to 300° C.) by-produced when decomposing or modificating petroleum.

The hydrogenated petroleum resin has a glass transition temperature (Tg) of 50° C. or higher, preferably 60° C. or higher, more preferably 60° C. to 100° C., a softening point, measured in accordance with ASTM E-28, of 100° C. or higher, preferably 110° C. or higher, more preferably 110° C. to 150° C., a specific gravity, measured in accordance with ASTM D-156, of 0.900 to 1.30, preferably 0.980 to 1.20, and a weight average molecular weight (Mw), measured by a gel permeation chromatography (GPC; column=TSK GEL G3000H×L and G4000H×L; solvent=THF; temperature= 40° C.; in terms of polystyrene), of 400 or more, preferably 500 or more, more preferably 500 to 2000.

Polypropylene resin composition

The first polypropylene resin composition of the present invention comprises 80 to 95% by weight, preferably 85 to 92% by weight, of the above propylene polymer (A) and 20 to 5% by weight, preferably 15 to 8% by weight, of the terpene resin having no polar group and/or the petroleum resin having no polar group (B).

The first polypropylene resin composition of the present invention may further comprise resins, such as a polyolefin other than polypropylene, a terpene resin having a polar group and a petroleum resin having a polar group, in addition to the above propylene polymer and the terpene resin having no polar group and/or the petroleum resin having no polar group. An amount of the other resin is desirably less than 20% by weight, preferably less than 15% by weight, based on 100% by weight of the total amount of the terpene resin having no polar group and the petroleum resin having no polar group. Further, when the resin other than the terpene resin having no polar group or the petroleum resin having no polar group is blended with the propylene polymer in an amount of 20% by weight or more, the water-vapor barrier properties of the resulting film sometimes become worse.

The second polypropylene resin composition of the present invention comprises 70 to 95% by weight, preferably 75 to 85% by weight, of the above propylene polymer (A) and 30 to 5% by weight, preferably 25 to 15% by weight, of a hydrogenated petroleum resin (D).

When the amount of the hydrogenated petroleum resin (D) is less than 5% by weight, the transparency of the sheet and thermoformability may be insufficient. On the other hand, when the amount of the hydrogenated petroleum resin (D) is more than 30% by weight, the thermoformability may be poor.

To the first polypropylene resin composition and the second polypropylene resin composition of the present invention may be added various additives such as rubber component to enhance impact strength, heat stabilizer, weathering stabilizer, antistatic agent, slip agent, antiblocking agent, viscosity modifier, color protection agent, antifogging agent, lubricant, dye, pigment, natural oil, synthetic oil and wax. They can be added in appropriate amounts.

Further, to the polypropylene resin composition of the present invention may be added fillers such as silica, diatomaceous earth, alumina, titanium oxide, magnesium oxide, pumice powder, pumice balloon, aluminum hydrooxide, magnesium hydrooxide, basic magnesium carbonate, dolomite, calcium sulfate, potassium titanate, barium sulfate, calcium sulfite, talc, clay, mica, asbestos, glass fiber, glass flake, glass bead, calcium silicate, montmorillonite, bentonite, graphite, aluminum powder, molybdenum sulfide, borone fiber, silicon carbide fiber, polyethylene fiber, polypropylene fiber, polyester fiber and polyamide fiber, with the proviso that the objects of the invention are not marred.

The first polypropylene resin composition of the present invention may be produced by conventional methods, for example, it may be produced by the following methods:

(1) a method which comprises mechanically blending the propylene polymer, the terpene resin having no polar group and/or the petroleum resin having no polar group, and optionally, other component by an extruder, kneader and the like, (2) a method which comprises dissolving the propylene polymer, the terpene resin having no polar group and/or the petroleum resin having no polar group, and optionally, other component in an appropriate good solvent (for example, hydrocarbon solvents, such as hexane, heptane, decane, cyclohexane, benzene, toluene and xylene), and removing the solvent from the mixture, (3) a method which comprises individually dissolving each of the propylene polymer, the terpene resin having no polar group and the petroleum resin having no polar group, and optionally, other component in an appropriate good solvent, and mixing the resultant solutions, and removing the solvent from the mixture; and (4) combinations of the above-mentioned methods (1) to (3).

The second polypropylene resin composition of the present invention may be produced by conventional methods, for example, by the same methods as described in the first polypropylene resin composition.

The first polypropylene resin composition of the present invention may be used for a stretched film or the base material of a multi-layer stretched sheet.

The second polypropylene resin composition of the present invention may be used for a sheet or the base material of a multi-layer sheet.

Hereinafter, the polypropylene stretched film formed from the first polypropylene resin composition and polypropylene multi-layer stretched film having a base layer formed from the composition, and the PTP packaging polypropylene sheet formed from the second polypropylene resin composition and PTP packaging polypropylene multi-layer sheet having a base layer formed from the composition are described in detail.

Polypropylene stretched film

The polypropylene stretched film of the present invention is a biaxially stretched film formed from the first polypropylene resin composition. The glass transition temperature (Tg) of the polypropylene stretched film is preferably in the range of from 0° to 10° C.

In the present invention, the glass transition temperature (Tg) is determined as follows.

That is, the Tg is determined by a method comprising setting 10 mg of the polymer sample in a scanning calorimeter (produced by Perkin Elmar Co.), drawing a thermograph from 20° C. at a heating rate of 40° C./min under a flow of nitrogen gas. From the results of the thermograph, the calculated average value of the temperature at which an endothermic peak is deviated from a base line and the temperature at which the endothermic peak is returned to the base line is defined as the glass transition temperature (Tg).

The stretch ratio of the polypropylene stretched film is preferably in the range of 4×4 to 7×12 (length×width). Though the thickness of the polypropylene stretched film is not particularly limited, it is generally in the range of 10 to 100 μm, preferably 15 to 70 μm.

The polypropylene stretched film of the present invention may be formed, for example, by the following method.

First, the propylene polymer and the terpene resin having no polar group and/or the petroleum resin having no polar group are mixed in predetermined amounts, and then the mixture is melt-extruded under the resin temperature of 220° to 280° C. to cast on a cooling roll or in a water trough, thereby obtaining an unstretched raw film. The temperature on the cooling roll or in the water trough is preferably in the range of 20 to 80 °C.

Next, the unstretched raw film is biaxially stretched so as to biaxially orientate, thereby obtaining a polypropylene stretched film of the present invention. The stretch ratio when biaxially stretching is preferably in the range of 4×4 to 7×12 (length×width).

The biaxial stretching may be performed by methods, such as successive or simultaneous tentering method and successive or simultaneous tubular method.

In the present invention, for improving surface adhesive properties, the surface of the polypropylene stretched film may be subjected to corona discharge treatment under an atmosphere of air, a carbon dioxide gas or a nitrogen gas so as to give the surface tension of the film of about 40 dyn/cm or more.

The polypropylene stretched film of the present invention exhibits excellent water-vapor barrier properties such that the water-vapor permeability is 2.5 (g/m$^2$·24hr/25 μm) or less, as well as excellent rigidity such that the Young's modulus is equal to or more than that of the conventional K-OP film. Moreover, chlorine gas does not generate when incinerating.

Polypropylene multi-layer stretched film

The polypropylene multi-layer stretched film of the present invention comprises a base layer formed from the first polypropylene resin composition and a surface layer formed from a propylene type polymer (C). The glass transition temperature (Tg) of the base layer of the propylene multi-layer stretched film is preferably in the range of 0° to 10° C.

Though the thickness of the polypropylene multi-layer stretched film is not particularly limited, it is generally in the range of 10 to 100 μm, preferably 15 to 70 μm.

In the present invention, it is preferred that the polypropylene multi-layer stretched film has a two-layer structure of a base layer formed from the first polypropylene resin composition and a surface layer formed from the propylene type polymer (C) which layer is formed on one surface of the base layer, or a three-layer structure of a base layer formed from the first polypropylene resin composition and two surface layers formed from the propylene type polymer (C) which layers are formed on both surfaces of the base layer. In the polypropylene multi-layer stretched film, the base layer formed from the polypropylene stretched film has a thickness of 80% or more, preferably 90% or more, based on the total thickness of the polypropylene multi-layer stretched film.

The propylene type polymer (C) forming the polypropylene multi-layer stretched film of the present invention is a homopolymer of propylene, or a block copolymer or random copolymer comprising a constituent unit derived from propylene and a constituent unit derived from ethylene and/or an olefin having 4 to 20 carbon atoms.

The propylene type polymer (C) contains a constituent unit derived from propylene in an amount of 50% by mol or more, preferably 60% by mol or more, more preferably 65% by mol or more.

Examples of the olefins having 4 to 20 carbon atoms include 1-butene, 1-pentene, 1-hexene, 4-methyl-1-pentene, 3-methyl-1-pentene, 1-octene, 3-methyl-1-butene, 1-decene, 1-dodecene, 1-tetradecene, 1-hexadecene, 1-octadecene, 1-eicosene, cyclopentene, cycloheptene, norbornene, 5-ethyl- 2-norbornene, tetracyclododecene and 2-ethyl-1,4, 5,8-dimethano- 1,2,3,4,4a,5,8,8a-octahydronaphthalene.

The propylene type polymer (c) may contain constituent units derived from diene compounds having 4 to 20 carbon atoms such as 1,3-butadiene, 1,3 -pentadiene, 1,4-pentadiene, 1,3-hexadiene, 1, 4-hexadiene, 1, 5-hexadiene, 4-methyl- 1,4-hexadiene, 5-methyl-1,4-hexadiene, 6-methyl-1, 6octadiene, 7-methyl-1,6-octadiene, 6-ethyl-1,6-octadiene, 6-propyl- 1,6-octadiene, 6-butyl- 1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene, 1,7-octadiene, 1,9-decadiene, isoprene, butadiene, ethylidenenorbornene, vinylnorbornene and dicyclopentadiene, in an amount of 2% by mol or less.

The propylene type polymer (C) has a pentad isotacticity [M$_5$] obtained from the above formula (3) using absorption intensity [Pmmmm] , [Pw] , [Sαγ], [Sαδ$^+$] and [Tδ$^+$δ$^+$] in a $^{13}$C-NMR spectrum of a boiled heptane-insoluble component contained in the polymer being in the range of 0.925 to 0,975, preferably 0.930 or more and less than 0.970; and a pentad tacticity [M3] obtained from the above formula (4) using absorption intensity [Pmmrm], [Pmrmr], [Pmrrr], [Prmrr], [Prmmr], [Prrrr], [Pw], [Sαγ], [Sαδ$^+$] and [Tδ$^+$δ$^+$] in a $^{13}$C-NMR spectrum of a boiled heptane-insoluble component contained in the polymer-being in the range of 0. 0020 to 0. 0050, preferably 0. 0025 to 0. 0040.

The propylene type polymer (C) has an intrinsic viscosity [η], as measured in decahydronaphthalene at 35° C., of 0.01 to 10 dl/g, preferably 0.08 to 7 dl/g.

To the propylene type polymer (C) may be added various additives such as antistatic agent, heat stabilizer, weathering stabilizer, slip agent, antiblocking agent, viscosity modifier, color protection agent, antifogging agent, lubricant, dye, pigment, natural oil, synthetic oil and wax. They can be added in appropriate amounts. Further, to the propylene type polymer (C) may be added fillers as described above.

The polypropylene multi-layer stretched film of the present invention can be obtained by laminating a surface layer of the propylene type polymer (C) on one surface of an unstretched raw film obtained in the production process of the polypropylene stretched film to obtain an unstretched multi-layer raw film such that the propylene type polymer (C) has a thickness of 20% or less based on the total thickness of the obtained unstretched multi-layer raw film, and biaxially stretching the unstretched multi-layer raw film in the same manner as in the polypropylene stretched film.

Thus, in the present invention, by the use of the propylene type polymer (C) as the surface layer of the polypropylene multi-layer stretched film, the resistance to chemicals can be enhanced, and the printability and an adhesive receptivity can markedly be improved. Further, when cast molding, the adhension properties between a cooling roll and the unstretched raw film is improved, so that the cooling effect is hightened, leading to the improvement of productivity.

In the present invention, for improving surface adhesive properties, the surface of the polypropylene multi-layer stretched film may be subjected to corona discharge treatment under an atmosphere of air, carbon dioxide gas or nitrogen gas so as to give a surface tension of the film of about 40 dyn/cm or more.

The polypropylene multi-layer stretched film of the present invention has excellent properties similar to the polypropylene stretched film, as well as excellent resistant to chemicals, printability and an adhesive receptivity. Further, the polypropylene multi-layer stretched film can be recycled by a re-extrusion.

PTP packaging polypropylene sheet

The PTP packaging polypropylene sheet of the present invention is formed from the second polypropylene resin composition.

Though the thickness of the PTP packaging polypropylene sheet is not particularly limited, it is generally in the range of 100 to 700 μm.

The PTP packaging polypropylene sheet of the present invention is produced by sheeting the second polypropylene resin composition using known sheeting machines, such as a T-die.

The PTP packaging polypropylene sheet of the present invention is excellent in water-vapor barrier properties and transparency as compared to the conventional PVDC coated sheet.

In general, PTP packaging is automatically performed in a manner comprising the steps of thermoforming a resin made sheet to form a plurality of recess portions, filling up the recess portions with drags and the like, sealing the sheet with an aluminum foil, forming perforations or slits in the sheet and then punching out the peripheral portion of the sheet.

The PTP packaging polypropylene sheet according to the present inventions is excellent in thermoformability as well as in thermal adhesion properties to an aluminum foil and punchability, and therefore, a PTP packaged product having uniform thickness can be produced with high speed.

Further, the produced PTP package is excellent in transparency, rigidity and water-vapor barrier properties. Moreover, chlorine gas does not generate when incinerating.

PTTP packaging polypropylene multi-layer sheet

The PTP packaging polypropylene multi-layer sheet of the present invention is a multi-layer sheet having a base layer formed from the second polypropylene resin composition and a surface layer formed from a synthetic resin. In the PTP packaging polypropylene multi-layer sheet, as the synthetic resin forming the surface layer, a synthetic resin not containing chlorine is preferred, and propylene type polymer (E) as described later is particularly preferred.

Though the thickness of the PTP packaging polypropylene multi-layer sheet is not particularly limited, it is generally in the range of 110 to 800 μm. Further, in the present invention, it is preferred that the PTP packaging polypropylene multi-layer sheet has a two-layer structure of a base layer formed from the second polypropylene resin composition and a surface layer formed from the propylene type polymer (E) which is formed on one surface of the base layer, or a three-layer structure of a base layer formed from the second polypropylene resin composition and two surface layers formed from the propylene type polymer (E) which layers are formed on both surfaces of the base layer.

In the PTP packaging polypropylene multi-layer sheet of the present invention, the ratio of the thickness of the base layer is 50% or more, preferably 55% or more, based on the total thickness (T) of the PTP packaging polypropylene multi-layer stretched film, and the total thickness of the sheet T (μm) and the proportion H (%) of the thickness of the base layer to the total thickness of the sheet satisfy the relationship represented by the formula:

$$3.4 \leq \log (T \times H) \leq 5.0,$$

preferably $$3.6 \leq \log (T \times H) \leq 4.6$$

When the proportion H is less than 50%, the formability of the PTP packaging polypropylene multi-layer sheet may be lowered. Further, when the log (T×H) value is less than 3.4, the water-vapor barrier properties of the PTP packaging polypropylene multi-layer sheet is insufficient, whereas when the log. (T×H) value is more than 5.0, the thermoformability may be lowered.

As the propylene type polymer (E) to be used in the present invention, the propylene polymer (A) or the conventional propylene type polymer may be used. Examples of the propylene type polymer (E) include:

(1) the propylene polymer (A),
(2) a conventional propylene homopolymer,
(3) a random copolymer of propylene and at least one of ethylene and an α-olefin having 4 carbon atoms or more, and
(4) a block copolymer of propylene and at least one of ethylene and an α-olefin having 4 carbon atoms or more.

The random copolymer or the block copolymer desirably contains a constituent unit derived from propylene in an amount of 90% by mol or more, preferably 95% by mol or more, and a constituent unit derived from a monomer selected from at least one of ethylene and an α-olefin having 4 carbon atoms or more in an amount of 10% by mol or less, preferably 5% by mol or less.

The propylene type polymer (E) preferably has a melt flow rate, as measured at 230° C under a load of 2.16 kg, of 0.1 to 500 g/10 min, preferably 0.2 to 200 g/10 rain, and a density of 0.900 g/cm$^3$ or more, preferably 0.900 to 0.936 g/cm$^3$.

The propylene type polymer (E) to be used in the present invention may contain a component unit derived from a diene compound as described above in an amount such that properties thereof are not marred. The amount of the diene compound is generally in the range of 0 to 1% by mol, preferably 0 to 0.5% by mol.

The propylene type polymer (E) may contain various stabilizers or fillers as contained in the polypropylene resin composition.

The PTP packaging polypropylene multi-layer sheet is produced by sheeting the second polypropylene resin composition forming the base layer and a resin, for example, the polypropylene type polymer (E), forming the surface layer by a co-extrusion using the known sheeting machines, such as a T-die.

The PTP packaging polypropylene multi-layer sheet according to the present invention is excellent in water-vapor barrier properties as compared to the conventional PVDC coated sheet, as well as in transparency.

The PTP packaging polypropylene multi-layer sheet of the present invention is excellent in thermoformability as well as in thermal adhesion properties to an aluminum foil and punchability, and therefore, a PTP packaged product having uniform thickness can be produced with high speed.

Further, the produced PTP package is excellent in transparency, rigidity and water-vapor barrier properties. Moreover, chroline gas does not generate when incinerating. Further, the PTP package can be recycled by a re-extrusion.

EFFECT OF THE INVENTION

The first polypropylene resin composition according to the present invention is capable of producing a film excellent in water-vapor barrier properties and transparency, and high in Young's modulus.

The polypropylene stretched film according to the present invention is excellent in water-vapor barrier properties and transparency, as well as high in Young's modulus. Moreover, chlorine gas does not generate when incinerating.

The polypropylene multi-layer stretched film according to the present invention is excellent in water-vapor barrier properties, transparency and high in Young's modulus as well as excellent in resistance to chemicals. Further, the film can be recycled by a re-extrusion.

The second polypropylene resin composition according to the present invention is capable of producing a sheet excellent in water-vapor barrier properties, as well as rigidity and transparency.

The press-through pack packaging polypropylene sheet according to the present invention is excellent in water-vapor barrier properties, well as rigidity, transparency and thermoformability. Moreover, chlorine gas does not generate when incinerating.

The press-through pack packaging polypropylene sheet and the press-through pack packaging polypropylene multi-layer sheet according to the present invention are excellent in water-vapor barrier properties, as well as rigidity, transparency and thermoformability. Moreover, chlorine gas does not generate when incinerating. Further, these sheet can be recycled by a re-extrusion.

EXAMPLE

The present invention is further illustrated by the following Examples, but the invention is in no way restricted to those Examples.

In Examples, a melt flow rate and a density of the polymer were determined by the following methods.
Melt Flow Rate The melt flow rate was measured in accordance with ASTM D-1238.
Density The density was measured in accordance with ASTM D-1505.

In Examples, physical properties of the film and sheet were determined by the following methods.
Moisture Permeability (water-vapor barrier properties)

The moisture permeability was measured in accordance with JIS Z-0208 at 40° C. and 90% RH.
Young's Modulus The Young's modulus was measured in accordance with ASTM D-882 under the conditions of a stress rate of 50 mm/min and a distance between chucks of 64.0 mm.
Haze The haze was measured in accordance with ASTM D-1003.
Formability The formability was evaluated by effecting the PTP packaging using PTP packaging machine M 2000 (produced by Kanae K. K.).
Preparation Example
Preparation of solid titanium catalyst component (A)]

240 kg of anhydrous magnesium chloride, 1100 liters of decane and 990 kg of 2-ethylhexylalcohol were charged into a 4.5 m³-reactor, and heated at 130° C. to give a homogeneous solution. Then, to the solution was added 54 kg of phthalic anhydride, thereby stirred at 130° C. to dissolve the phthalic anhydride in the solution. The thus obtained homogeneous solution was cooled to room temperature, and then all the homogeneous solution was dropwise charged into 6.7 m³ of titanium tetrachloride kept at −25° C. under stirring. The temperature after the completion of the charging was about −20° C. Then, the temperature of the resulting mixture liquid was raised to 110° C. over a period of 4 hours. When the temperature of the mixture liquid reached to 110° C. 13 kg of diisobutyl phthalate (DIBP) was added to the mixture liquid, and then resulting mixture was stirred at the same temperature for 2 hours.

After the reaction was completed, the solid portion was recovered by means of the hot filtration. The solid portion was resuspended in 7.3 m³ of titanium tetrachloride, and the obtained suspension was further heated at 110° C. for 2 hours to effect a reaction. After the reaction was completed, the solid portion was recovered again by means of the hot filtration. The solid portion was well washed with decane and hexane kept at 110° C. until no titanium compound liberating in the solution was detected. Thus, the solid titanium component (A) was prepared.

The solid titanium component (A) obtained had a composition comprising 2.2% by weight of titanium, 61% by weight of chlorine, 19% by weight of magnesium, and 12.7% by weight of DIBP.
[Preparation of prepolymerized catalyst (B) ]

Into a 80-liter reactor equipped with a stirrer, 40 liters of purified hexane, 3.0 mol of triethylaluminum, 3.0 mol of trimethylmethoxysilane and 0.3 mol Ti (in terms of titanium atom) of the above-obtained solid titanium catalyst component (A) were charged under an atmosphere of nitrogen. Thereafter, 1.5 kg of 3-methyl-1-butene (3MB-1) was charged into the reactor at 20° C. to effect a prepolymerization for 2 hours. After the reaction was completed, the reactor was purged with nitrogen, and a washing operation consisting of removal of the supernatant liquid and addition of purified hexane was carried out three times to obtain a prepolymerized catalyst (B). The prepolymerized catalyst (B) was resuspended with purified hexane, and stored.
[Polymerization ]

Into a 1000-liter reactor equipped with a stirrer, 450 liters of purified n-hexane was charged, and further 500 mmol of triethylaluminum, 500 mmol of dicyclopentyldimethoxysilane and 10 mmol Ti (in terms of titanium atom) of the above-obtained prepolymerized catalyst (B) were charged at 60° C. under an atmosphere of propylene.

Further, 250 liters of hydrogen was introduced into the reactor, and the temperature was raised to 80° C., followed by keeping the same temperature for 4 hours to effect a propylene polymerization. The pressure during the polymerization was kept at 6 kg/cm²-G. After the polymerization was completed, the pressure was released, and then, the slurry containing the produced solid was separated by centrifuging and dried by means of a dryer, thereby obtaining 200 kg of a white powdery polymer.

The polymer obtained had a melt flow rate of 2 g/10 rain, a pentad isotacticity [$M_5$] of a boiled heptane-insoluble component of 0.986, a pentad tacticity [$M_3$] of a boiled heptane-insoluble component of 0.0030, a crystallinity of a boiled heptane-insoluble component of 78.5%, a 3MB-1 polymer content of 300 ppm, and a density of 0.919 g/cm³.
Comparative Preparation Example
[Preparation of prepolymerized catalyst]

Into a 80-liter reactor equipped with a stirrer, 40 liters of purified hexane, 0.9 mol of triethylaluminum and 0.3 mol Ti (in terms of titanium atom) of the above-obtained solid titanium catalyst component (A) were charged under an atmosphere of nitrogen. Thereafter, 1.66 kg of propylene was charged into the reactor at 20° C. to effect a prepolymerization for 2 hours. After the reaction was completed, the reactor was purged with nitrogen, and a washing operation consisting of removal of the supernatant liquid and addition of purified hexane was carried out three times to obtain a prepolymerized catalyst (C). The prepolymerized catalyst obtained (C) was resuspended with purified hexane, and stored.

[Polymerization]

Into a 1000-liter reactor equipped with a stirrer, 450 liters of purified n-hexane was charged, and further 500 mmol of triethylaluminum, 100 mmol of diphenyldimethoxysilane and 10 mmol Ti (in terms of titanium atom) of the above-obtained prepolymerized catalyst (C) were charged at 60° C. under an atmosphere of propylene.

Further, 100 liters of hydrogen was introduced into the reactor, and the temperature was raised to 80° C., followed by keeping the same temperature for 3 hours to effect a propylene polymerization. The pressure during the polymerization was kept at 6 kg/cm$^2$-G. After the polymerization was completed, the pressure was released, and then, the slurry containing the produced solid was separated by centrifuging and dried by means of a dryer, thereby obtaining 230 kg of a white powdery polymer.

The polymer obtained had a melt flow rate of 2 g/10 min, a pentad isotacticity [MS] of a boiled heptane-insoluble component of 0.954, a pentad tacticity [$M_3$] of a boiled heptane-insoluble component of 0.0036, a crystallinity of a boiled heptane-insoluble component of 58.5%, a 3MB-1 polymer content of 0 ppm, and a density of 0.900 g/cm$^3$.

EXAMPLE 1

Propylene polymer obtained in Preparation Example: . . . 85 parts by weight

Petroleum resin having no polar group (trade name: ESCOREZ 5320, produced by TONEX Co., Ltd.; hydrogenation ratio: 98%, Tg: 70° C., softening point: 125° C. specific gravity: 1.10, Mw: 600): . . . 15 parts by weight Irganox 1010 (trade name, produced by Nippon Ciba Geigy, Co.): . . . 1000 ppm Calcium stearate: . . . 100 ppm The above-indicated components were mixed and melted at 250° C. to extrude a cast film which was cooled on a cooling roll kept at 60° C. to form an unstretched raw film having a thickness of 900 μm. Then, this unstretched raw film was subjected to successively biaxial stretching to 4.5 times in the longitudinal direction and 8 times in the traverse direction by the tentering method to obtain a polypropylene stretched film having a thickness of 25 μm. The physical properties of the thus obtained polypropylene stretched film were determined and the results are shown in Table 1.

EXAMPLE 2

Propylene polymer obtained in Preparation Example: . . . 85 parts by weight

Petroleum resin having no polar group (trade name:

ESCOREZ 5320, produced by TONEX Co., Ltd.): . . . 15 parts by weight

Irganox 1010 (trade name, produced by Nippon Ciba Geigy, Co.): . . . 1000 ppm

Calcium stearate: . . . 100 ppm

Two surface layers formed from a polypropylene (trade name: HIPOL F309, produced by Mitsui Petrochemical Industries, Ltd.; [$M_5$]=0.958, [$M_3$]=0.0035, MFR: 2.0 g/10 min, density: 0.912 g/cm$^3$) were coextruded on both surfaces of the base layer formed from the polypropylene resin composition comprising the above-indicated components to give a cast film which was cooled on a cooling roll kept at 60° C. to form a multi-layer unstretched raw film having a thickness of 900 gm. The thus formed multi-layer unstretched raw film had a layer structure of 1/18/1 (surface layer/base layer/surface layer) thickness ratio. Then, the multi-layer unstretched raw film was subjected to successively biaxially stretching to 4.5 times in the longitudinal direction and 8 times in the traverse direction by the tentering method to obtain a polypropylene multi-layer stretched film having a thickness of 25 μm.

The physical properties of the thus obtained polypropylene multi-layer stretched film were determined and the results are shown in Table 1.

EXAMPLE 3

Propylene polymer obtained in Preparation Example: . . . 85 parts by weight

Petroleum resin having no polar group (trade name: ESCOREZ 5320, produced by TONEX Co., Ltd.): . . . 15 parts by weight Irganox 1010 (trade name, produced by Nippon Ciba Geigy, Co.): . . . 1000 ppm Calcium stearate: . . . 100 ppm The above-indicated components were mixed and melted at 240° C. to extrude a tubular film which was cooled in a cooling water kept at 25° C. to form a tubular unstretched raw film having a thickness of 750 μm. Then, this tubular unstretched raw film was subjected to simultaneously biaxial stretching to 6 times in the longitudinal direction and 5 times in the traverse direction by the tubular method to obtain a polypropylene stretched film having a thickness of 25 μm.

The physical properties of the thus obtained polypropylene stretched film were determined and the results are shown in Table 1.

EXAMPLE 4

The same procedure as in Example 1 was repeated except that the amounts of the propylene polymer and the petroleum resin having no polar group were changed to 95 parts by weight and 5 parts by weight, respectively, thereby o obtaining a polypropylene stretched film having a thickness of 25 μm.

The physical properties of the thus obtained polypropylene stretched film were determined and the results are shown in Table 1.

EXAMPLE 5

The same procedure as in Example 1 was repeated except that the amounts of the propylene polymer and the petroleum resin having no polar group were changed to 90 parts by weight and 10 parts by weight, respectively, thereby obtaining a polypropylene stretched film having a thickness of 25 μm.

The physical properties of the thus obtained polypropylene stretched film were determined and the results are shown in Table 1.

EXAMPLE 6

The same procedure as in Example 1 was repeated except that the amounts of the propylene polymer and the petroleum resin having no polar group were changed to 80 parts by weight and 20 parts by weight, respectively, thereby obtaining a polypropylene stretched film having a thickness of 25μm.

The physical properties of the thus obtained polypropylene stretched film were determined and the results are shown in Table 1.

EXAMPLE 7

The same procedure as in Example 1 was repeated except that instead of ESCOREZ 5320 (trade name, produced by TONEX Co., Ltd. ), ESCOREZ ECR 356B (trade name, produced by TONEX Co , Ltd; hydrogenation ratio: 98%, Tg: 84° C. softening point: 140° C., specific gravity: 1.10, Mw: 650) was used as a petroleum resin having no polar group, thereby obtaining a polypropylene stretched film having a thickness of 25 μm.

The physical properties of the thus obtained polypropylene stretched film were determined and the results are shown in Table 1.

EXAMPLE 8

The same procedure as in Example 1 was repeated except that instead of ESCOREZ 5320 (trade name, produced by TONEX Co., Ltd. ), ARKON P-115 (trade name, produced by Arakawa kagaku kogyo Industry; hydrogenation ratio: 99%, Tg: 68 ° C., softening point: 115° C., specific gravity: 0.999, Mw: 1600) was used as a petroleum resin having no polar group, thereby obtaining a polypropylene stretched film having a thickness of 25 μm.

The physical properties of the thus obtained polypropylene stretched film were determined and the results are shown in Table 1.

EXAMPLE 9

The same procedure as in Example 1 was repeated except that instead of ESCOREZ 5320 (trade name, produced by TONEX Co., Ltd.), ARKON P-125 (trade name, produced by Arakawa kagaku kogyo Industry; hydrogenation ratio: 99%, Tg: 78° C., softening point: 125° C., specific gravity: 0.999, Mw: 1750) was used as a petroleum resin having no polar group, thereby obtaining a polypropylene stretched film having a thickness of 25 μm.

The physical properties of the thus obtained polypropylene stretched film were determined and the results are shown in Table 1.

COMPARATIVE EXAMPLE 1

The same procedure as in Example 1 was repeated except that the propylene polymer obtained in Comparative Preparation Example was used instead of the propylene polymer obtained in Preparation Example, thereby obtaining a polypropylene stretched film.

The physical properties of the thus obtained polypropylene stretched film were determined and the results are shown in Table 1.

COMPARATIVE EXAMPLE 2

The same procedure as in Example 1 was repeated except that the petroleum resin having no polar group was not used, thereby obtaining a polypropylene stretched film.

The physical properties of the thus obtained polypropylene stretched film were determined and the results are shown in Table 1.

REFERENCE EXAMPLE 1

A polypropylene (trade name: HIPOL F309, produced by Mitsui Petrochemical Industries Ltd.; [$M_{5}$]: 0.958, [$M_3$]: 0.0035) was melted at 250° C. to extrude a cast film which was cooled on a cooling roll kept at 60° C. to form an unstretched raw film having a thickness of 900 μm. Then, this unstretched raw film was subjected to successively biaxially stretching to 4.5 times in the longitudinal direction and 8 times in the traverse direction by the tentering method to obtain a polypropylene stretched film having a thickness of 25 μm. Further, PVDC was coated on both surfaces of this polypropylene stretched film to form a coating layer having a thickness of 0.5 μm on each surface. Thus, a K-OP film was obtained.

The physical properties of the thus obtained K-OP film were determined and the results are shown in Table 1.

TABLE 1

| | Tg (°C.) | moisture permeability *1 | Formability when stretching *2 | Young's Modulus in Tension (traverse direction) × $10^4$ (kg/cm$^2$) | Haze (%) |
|---|---|---|---|---|---|
| Ex. 1 | 4 | 2.0 | A | 6.4 | 0.4 |
| Ex. 2 | 7 | 2.3 | A | 6.0 | 0.6 |
| Ex. 3 | 6 | 2.4 | A | 5.0 | 0.7 |
| Ex. 4 | 2 | 2.6 | A | 6.5 | 0.8 |
| Ex. 5 | 3 | 2.4 | A | 6.4 | 0.6 |
| Ex. 6 | 7 | 1.9 | A | 6.5 | 0.4 |
| Ex. 7 | 6 | 1.8 | A | 6.7 | 0.4 |
| Ex. 8 | 3 | 2.6 | A | 6.2 | 0.8 |
| Ex. 9 | 5 | 2.3 | A | 6.5 | 0.8 |
| Com. Ex. 1 | 18 | 3.8 | A | 5.2 | 0.7 |
| Com. Ex. 2 | 0 | 3.0 | C *3 | 6.5 | 1.0 |
| Ref. Ex. 1 | 0 | 2.5 | A | 5.0 | 0.7 |

*1: g/m$^2$.24 hr/25 μm
*2: A . . . good, C . . . poor
*3: A large number of breakages occur when traverse stretching As is apparent from the results shown in Table 1, the polypropylene stretched film of the present invention had a moisture permeability ranging of from 1.9 to 2.6 g/m$^2$·24 hr/25 μm. These values are lower than 3.0 g/m$^2$·24 hr/25 μm which had been considered as a lower limit of the moisture permeability of the conventional polypropylene type film. Thus, the polypropylene stretched film of the present invention had a water-vapor barrier properties equal to or more than the K-OP film. On the other hand, the polypropylene stretched film comprising the conventional polypropylene and a petroleum resin having no polar group had a moisture permeability of 3.8 g/m$^2$√24 hr/25 μm. This value is as much as about 1.5 times of the moisture permeability of the K-OP film.

EXAMPLE 10

80 parts by weight of the propylene polymer obtained in Preparation Example and 20 parts by weight of a hydrogenated petroleum resin (trade name: ESCOREZ 5320, produced by TONEX Co., Ltd.) were mixed by means of a Henschel mixer. Then, the mixture was extruded at 240° C. using an extruder having a 65 mm Ø to prepare pellets formed from a polypropylene resin composition comprising the propylene polymer and the hydrogenated petroleum resin. The thus prepared pellets were subjected to sheeting by means of a T-die set at a chill roll temperature of 40° C. and an extrusion temperature of 220° C. thereby obtaining a PTP packaging polypropylene sheet having a thickness of 300 μm and a width of 300 mm.

The physical properties of the thus obtained PTP packaging polypropylene sheet were determined and the results are shown in Table 2.

EXAMPLE 11

The pellets formed from the polypropylene resin composition obtained in Example 10 and pellets formed from a propylene type polymer (trade name: HIPOL F401, produced by Mitsui Petrochemical Industries Ltd.; melt flow rate: 2.8 g/10 min, density: 0.909 g/cm$^3$) were coextruded and subjected to sheeting by means of a T-die set at a chill roll temperature of 40° C. and an extrusion temperature of 220° C., thereby obtaining a three layered PTP packaging sheet having a base layer formed from the polypropylene resin composition and two surface layers formed from the propylene type polymer. The thus obtained PTP packaging polypropylene multi-layer sheet had a thickness of 300 μm and a width of 300 mm, and had a layer structure of 20/260/20 μm (surface layer/base layer/surface layer).

The physical properties of the thus obtained PTP packaging polypropylene multi-layer sheet were determined and the results are shown in Table 2.

EXAMPLE 12

The same procedure as in Example 10 was repeated except that the amounts of the propylene polymer and the hydrogenated petroleum resin were changed to 90 parts by weight and 10 parts by weight, respectively, thereby obtaining a PTP packaging polypropylene sheet having a width of 300 mm and a thickness of 300 μm.

The physical properties of the thus obtained PTP packaging polypropylene sheet were determined and the results are shown in Table 2.

EXAMPLE 17

The same procedure as in Example 10 was repeated except that the amounts of the propylene polymer and the hydrogenated petroleum resin were changed to 70 parts by weight and 30 parts by weight, respectively, thereby obtaining a PTP packaging polypropylene sheet having a width of 300 mm and a thickness of 300 μm.

The physical properties of the thus obtained PTP packaging polypropylene sheet were determined and the results are shown in Table 2.

EXAMPLE 14

The same procedure as in Example 10 was repeated except that instead of ESCOREZ 5320 (trade name, produced by TONEX Co., Ltd.), ESCOREZ ECR 356B was used as a hydrogenated petroleum resin, thereby obtaining a PTP packaging polypropylene sheet having a width of 300 mm and a thickness of 300 μm.

The physical properties of the thus obtained PTP packaging polypropylene sheet were determined and the results are shown in Table 2.

EXAMPLE 15

The same procedure as in Example 10 was repeated except that instead of ESCOREZ 5320 (trade name, produced by TONEX Co., Ltd.), ARKON P-115 (trade name, produced by Arakawa kagaku kogyo Industry) was used as a hydrogenated petroleum resin, thereby obtaining a PTP packaging polypropylene sheet having a width of 300 mm and a thickness of 300 μm.

The physical properties of the thus obtained PTP packaging polypropylene sheet were determined and the results are shown in Table 2.

EXAMPLE 16

The same procedure as in Example 10 was repeated except that instead of ESCOREZ 5320 (trade name, produced by TONEX Co., Ltd.), ARKON P-125 (trade name, produced by Arakawa kagaku kogyo Industry) was used as a hydrogenated petroleum resin, thereby obtaining a PTP packaging polypropylene sheet having a width of 300 mm and a thickness of 300 μm.

The physical properties of the thus obtained PTP packaging polypropylene sheet were determined and the results are shown in Table 2.

COMPARATIVE EXAMPLE 3

The same procedure as in Example 10 was repeated except that instead of the propylene polymer used in Example 10, the propylene polymer obtained in Comparative Preparation Example was used, thereby obtaining a PTP packaging polypropylene-sheet.

The physical properties of the thus obtained PTP packaging polypropylene sheet were determined and the results are shown in Table 2.

COMPARATIVE EXAMPLE 4

The same procedure as in Example 10 was repeated except that instead of the propylene polymer used in Example 10, there was used a polypropylene having a melt flow rate, at 230° C. under a load of 2.16 kg, of 2 g/10 min, a pentad isotacticity [$M_5$] of a boiled heptane-insoluble component of 0.962, a pentad tacticity [$M_3$] of a boiled heptane-insoluble component of 0.0024, a crystallinity of a boiled heptane-insoluble component of 60.5%, which was prepared by the similar manner as in Comparative Preparation Example, thereby obtaining a PTP packaging polypropylene sheet.

The physical properties of the thus obtained PTP packaging polypropylene sheet were determined and the results are shown in Table 2.

COMPARATIVE EXAMPLE 5

The same procedure as in Example 11 was repeated except that the multi-layer sheet had a layer structure of 80/140/80 μm (surface layer/base layer/surface layer), thereby obtaining a PTP packaging polypropylene multi-layer sheet.

The physical properties of the thus obtained PTP packaging polypropylene multi-layer sheet were determined and the results are shown in Table 2.

COMPARATIVE EXAMPLE 6

Pellets formed from a propylene type polymer (trade name: HIPOL F401, produced by Mitsui Petrochemical Industries Ltd.) was subjected to sheeting by means of a T-die set at a chill roll temperature of 40° C. and an extrusion temperature of 220° C. to obtain a sheet having a thickness of 280 μm and a width of 300 mm. Then, PVDC film having a thickness of 10 μm was dry-laminated on both surfaces of the sheet, thereby obtaining a PVDC coated sheet having a thickness of 300 μm.

The physical properties of the thus obtained PVDC coated sheet were determined and the results are shown in Table 2.

TABLE 2

|  | Forma-bility *4 | Moisture permea-bility *6 | Haze (%) | Young's Modulus × 10⁴ kg/cm² | Generation of chlorine gas when incinerating | Thickness of base layer (%) *7 | Value of log (T × H) |
|---|---|---|---|---|---|---|---|
| Ex. 10 | A | 0.30 | 50 | 2.5 | none | — | — |
| Ex. 11 | A | 0.30 | 50 | 2.4 | none | 87 | 4.4 |
| Ex. 12 | A | 0.34 | 55 | 2.3 | none | — | — |
| Ex. 13 | A | 0.28 | 45 | 2.6 | none | — | — |
| Ex. 14 | A | 0.30 | 50 | 2.6 | none | — | — |
| Ex. 15 | A | 0.35 | 50 | 2.4 | none | — | — |
| Ex. 16 | A | 0.33 | 50 | 2.5 | none | — | — |
| Com. Ex. 3 | A | 0.55 | 50 | 1.9 | none | — | — |
| Com. Ex. 4 | A | 0.55 | 50 | 1.8 | none | — | — |
| Com. Ex. 5 | C *5 | 0.85 | 55 | 1.7 | none | 47 | 4.1 |
| Com. Ex. 6 | C *5 | 0.30 | 60 | 1.5 | generated | 93 | 4.4 |

*4: Formability when PTP packaging; A . . . good, C . . . poor
*5: Nonuniform section occurred.
*6: g/m².24 hr/300 μm
*7: Proportion of thickness of base layer to total thickness of sheet

What is claimed is:

1. A polypropylene resin composition comprising:
(A) 80 to 95% by weight of a propylene polymer having such properties that: a melt flow rate (MFR) of said polymer at 230° C. under a load of 2.16 kg is in the range of 0.1 to 500 g/10 rain, a pentad isotacticity [M5] obtained from the following formula (1) using absorption intensity [Pmmmm] and [Pw] in a $^{13}$C-NMR spectrum of a boiled heptane-insoluble component 0 contained in said polymer is in the range of 0.970 to 0.995, a pentad tacticity [M₃] obtained from the following formula (2) using absorption intensity [Pmmrm], [Pmrmr], [Pmrrr], [Prmrr], [Prmmr], [Prrrr] and [Pw] in a $^{13}$C-NMR spectrum of a boiled heptane-insoluble component contained in said polymer is in the range of 0.0020 to 0.0050, and a crystallinity of a boiled heptane-insoluble component contained in said polymer is not less than 60%; and (B) 20 to 5% by weight of a terpene resin having no polar group and/or a petroleum resin having no polar group;

$$[M_5] = \frac{[Pmmmm]}{[Pw]} \quad (1)$$

wherein

[Pmmmm] is absorption intensity of methyl groups present in the third unit among continuous five propylene units which are bonded to each other with meso form, and

[Pw] is absorption intensity of all methyl groups in a propylene unit;

$$[M_3] = \frac{[Pmmrm] + [Pmrmr] + [Pmrrr] + [Prmrr] + [Prmmr] + [Prrrr]}{[Pw]} \quad (2)$$

wherein

[Pmmrm] is absorption intensity of methyl groups present in the third unit among continuous five propylene units represented by  in which ⌐ and ⌐ are a units represented by propylene unit,

[Pmrmr] is absorption intensity of methyl groups present in the third unit among continuous five propylene units represented by  in which ⌐ and ⌐ are each a propylene unit,

[Pmrrr] is absorption intensity of methyl groups present in the third unit among continuous five propylene units represented by  in which ⌐ and ⌐ are each a propylene unit,

[Prmrr] is absorption intensity of methyl groups present in the third unit among continuous five propylene units represented by  in which ⌐ and ⌐ are each a propylene unit,

[Prmmr] is absorption intensity of methyl groups present in the third unit among continuous five propylene units represented by  in which ⌐ and ⌐ are each a propylene unit,

[Prrrr] is absorption intensity of methyl groups present in the third unit among continuous five propylene units represented by  in which ⌐ and ⌐ are each a propylene unit, and

[Pw] is absorption intensity of all methyl groups in a propylene unit.

2. The polypropylene resin composition as claimed in claim 1, wherein said propylene polymer contains 10–10,000 ppm of polymer comprising constituent units derived from a compound represented by the following formula (i) or (ii):

$$H_2C=CH-X \quad (i)$$

$$H_2C=CH-CH_2-X \quad (ii)$$

wherein X is a cycloalkyl group, an aryl group or

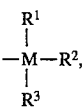

M is carbon or silicon, $R^1$ and $R^2$ are each a hydrocarbon group, and $R^3$ is hydrogen or a hydrocarbon group.

3. A polypropylene stretched film formed from a polypropylene resin composition comprising:
(A) 80 to 95% by weight of a propylene polymer having such properties that:

a melt flow rate (MFR) of said polymer at 230° C. under a load of 2.16 kg is in the range of 0.1 to 500 g/10 min, a pentad isotacticity [$M_5$] obtained from the following formula (1) using absorption intensity [Pmmmm] and [Pw] in a $^{13}$C-NMR spectrum of a boiled heptane-insoluble component contained in said polymer is in the range of 0.970 to 0.995, a pentad tacticity [$M_3$] obtained from the following formula (2) using absorption intensity [Pmmrm], [Pmrmr], [Pmrrr], [Prmrr], [Prmmr], [Prrrr] and [Pw] in a $^{13}$C-NMR spectrum of a boiled heptane-insoluble component contained in said polymer is in the range of 0.0020 to 0.0050, and a crystallinity of a boiled heptane-insoluble component contained in said polymer is not less than 60%; and (B) 20 to 5% by weight of a terpene resin having no polar group and/or a petroleum resin having no polar group, wherein said polypropylene stretched film has a glass transition temperature (Tg) of 0 to 10 ° C;

$$[M_5] = \frac{[Pmmmm]}{[Pw]} \quad (1)$$

wherein

[Pmmmm] is absorption intensity of methyl groups present in the third unit among continuous five propylene units which are bonded to each other with meso form, and

[Pw] is absorption intensity of all methyl groups in a propylene unit;

$$[M_3] = \frac{[Pmmrm] + [Pmrmr] + [Pmrrr] + [Prmrr] + [Prmmr] + [Prrrr]}{[Pw]} \quad (2)$$

wherein

[Pmmrm] is absorption intensity of methyl groups present in the third unit among continuous five propylene units represented by  in which ⌐ and ⌐ are each a propylene unit,

[Pmrmr] is absorption intensity of methyl groups present in the third unit among continuous five propylene units represented by  in which ⌐ and ⌐ are each a propylene unit,

[Pmrrr] is absorption intensity of methyl groups present in the third unit among continuous five propylene units represented by  in which ⌐ and ⌐ are each a propylene unit,

[Prmrr] is absorption intensity of methyl groups present in the third unit among continuous five propylene units represented by  in which ⌐ and ⌐ are each a propylene unit,

[Prmmr] is absorption intensity of methyl groups present in the third unit among continuous five propylene units represented by  in which ⌐ and ⌐ are each a propylene unit,

[Prrrr] is absorption intensity of methyl groups present in the third unit among continuous five propylene units represented by  in which ⌐ and ⌐ are each a propylene unit, and

[Pw] is absorption intensity of all methyl groups in a propylene unit.

4. The polypropylene stretched film as claimed in claim 3, wherein said propylene polymer contains 10–10,000 ppm of polymer comprising constituent units derived from a compound represented by the following formula (i) or (ii):

$$H_2C=CH-X \quad (i)$$

$$H_2C=CH-CH_2-X \quad (ii)$$

wherein X is a cycloalkyl group, an aryl group or

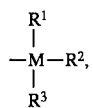

M is carbon or silicon, $R^1$ and $R^2$ are each a hydrocarbon group, and $R^3$ is hydrogen or a hydrocarbon group.

5. A polypropylene resin composition comprising:

(A) 70 to 95% by weight of a propylene polymer having such properties that:

a melt flow rate (MFR) of said polymer at 230° C. under a load of 2.16 kg is in the range of 0.1 to 500 g/10 min, a pentad isotacticity [$M_5$] obtained from the following formula (1) using absorption intensity [Pmmmm] and [Pw] in a $^{13}$C-NMR spectrum of a boiled heptane-insoluble component contained in said polymer is in the range of 0.970 to 0.995, a pentad tacticity [$M_3$] obtained from the following formula (2) using absorption intensity [Pmmrm], [Pmrmr], Pmrrr], [Prmrr], [Prmmr], [Prrrr] and [Pw] in a $^{13}$C-NMR spectrum of a boiled heptane-insoluble component contained in said polymer is in the range of 0.0020 to 0.0050, and a crystallinity of a boiled heptane-insoluble component contained in said polymer is not less than 60%; and (D) 30 to 5% by weight of a hydrogenated petroleum resin, $$[M_5] = \frac{[Pmmmm]}{[Pw]} \quad (1)$$

wherein

[Pmmmm] is absorption intensity of methyl groups present in the third unit among continuous five propylene units which are bonded to each other with meso form, and

[Pw] is absorption intensity of all methyl groups in a propylene unit;

$$[M_3] = \frac{[Pmmrm] + [Pmrmr] + [Pmrrr] + [Prmrr] + [Prmmr] + [Prrrr]}{[Pw]} \quad (2)$$

wherein

[Pmmrm] is absorption intensity of methyl groups present in the third unit among continuous five propylene units represented by  in which ⌐ and ⌐ are each a propylene unit,

[Pmrmr] is absorption intensity of methyl groups present in the third unit among continuous five propylene units represented by  in which ⌐ and ⌐ are each a propylene unit,

[Pmrrr] is absorption intensity of methyl groups present in the third unit among continuous five propylene units represented by  in which ⌐ and ⌐ are each a propylene unit,

[Prmrr] is absorption intensity of methyl groups present in the third unit among continuous five propylene units represented by  in which ⌐ and ⌐ are each a propylene unit,

[Prmmr] is absorption intensity of methyl groups present in the third unit among continuous five propylene units represented by  in which ⌐ and ⌐ are each a propylene unit,

[Prrrr] is absorption intensity of methyl groups present in the third unit among continuous five propylene units represented by 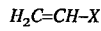 in which ⌐ and ⌐ are each a propylene unit, and

[Pw] is absorption intensity of all methyl groups in a propylene unit.

6. The polypropylene resin composition as claimed in claim 5, wherein said propylene polymer contains 10–10,000 ppm of polymer comprising constituent units derived from a compound represented by the following formula (i) or (ii):

$H_2C=CH-X$ (i)

$H_2C=CH-CH_2-X$ (ii)

wherein X is a cycloalkyl group, an aryl group or

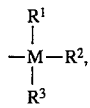

M is carbon or silicon, $R^1$ and $R^2$ are each a hydrocarbon group, and $R^3$ is hydrogen or a hydrocarbon group.

7. The polypropylene stretched film of claim 3 wherein the stretch ratio of length to width of the film is in the range of 4×4 to 7×12.

8. The polypropylene stretched film of claim 3 wherein the film has a thickness of from about 10 to about 100 μm.

9. The polypropylene stretched film of claim 3 wherein the film has a surface tension of at least about 40 dyn/cm.

10. The polypropylene stretched film of claim 3 wherein the film has a water-vapor permeability of no greater than 2.5 g/m²·24 hr/25 μm.

11. The polypropylene stretched film of claim 3 wherein the film does not generate chlorine gas upon burning.

12. The polypropylene stretched film of claim 3 wherein the boiled-heptane-insoluble component contained in the propylene polymer is present in an amount of at least 96% by weight.

13. The polypropylene stretched film of claim 4 wherein the compound represented by formula (i) or (ii) is 3-methyl-1-butene.

14. The polypropylene resin composition of claim 1 wherein in the propylene polymer (A) the crystallinity of the boiled heptane-insoluble component contained in the polymer is not less than 70%.

15. The propylene resin composition of claim 1 comprising 85 to 92% by weight of propylene polymer (A) and 15 to 8% by weight of the terpene resin having no polar group.

16. The propylene resin composition of claim 1 comprising 85 to 92% by weight of propylene polymer (A) and 15 to 8% by weight of the petroleum resin having no polar group.

17. The polypropylene stretched film of claim 3 wherein in the propylene polymer (A) the crystallinity of the boiled heptane-insoluble component contained in the polymer is not less than 70%.

18. The polypropylene resin composition of claim 5 wherein in the propylene polymer (A) the crystallinity of the boiled heptane-insoluble component contained in the polymer is not less than 70%.

* * * * *